US012131437B2

(12) United States Patent
Eble et al.

(10) Patent No.: US 12,131,437 B2
(45) Date of Patent: Oct. 29, 2024

(54) DYNAMIC FOVEATED PIPELINE

(71) Applicant: Apple Inc., Cupertino, CA (US)

(72) Inventors: Tobias Eble, Sunnyvale, CA (US); Ye Cong, Santa Clara, CA (US); Cody J. White, San Francisco, CA (US); Arthur Yasheng Zhang, San Jose, CA (US); Randall Rauwendaal, San Jose, CA (US); Moinul Khan, San Jose, CA (US); Jim C. Chou, San Jose, CA (US); Hao Pan, Sunnyvale, CA (US); Nicolas Bonnier, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/510,916

(22) Filed: Nov. 16, 2023

(65) Prior Publication Data
US 2024/0087080 A1 Mar. 14, 2024

Related U.S. Application Data

(63) Continuation of application No. 17/053,181, filed as application No. PCT/US2019/030819 on May 6, 2019, now Pat. No. 11,836,885.
(Continued)

(51) Int. Cl.
G06T 3/18 (2024.01)
G06T 3/40 (2024.01)
G06T 9/00 (2006.01)

(52) U.S. Cl.
CPC ............. *G06T 3/18* (2024.01); *G06T 3/40* (2013.01); *G06T 9/001* (2013.01)

(58) Field of Classification Search
CPC ......... G06T 3/0093; G06T 3/40; G06T 9/001; G06T 5/002; G06T 15/205;
(Continued)

(56) References Cited

U.S. PATENT DOCUMENTS 5,917,549 A * 6/1999 Simons ............... G06T 3/40
348/E7.003
6,252,989 B1 6/2001 Geisler et al.
(Continued)

FOREIGN PATENT DOCUMENTS

CN 102124742 A 7/2011
CN 105262933 A 1/2016
(Continued)

OTHER PUBLICATIONS

PCT International Search Report and Written Opinion dated Sep. 16, 2019, International Application No. PCT/ US2019/030819, pp. 1-22.
(Continued)

*Primary Examiner* — Charles T Shedrick
(74) *Attorney, Agent, or Firm* — Fernando & Partners, LLP

(57) ABSTRACT

In one implementation, a method includes receiving a warped image representing simulated reality (SR) content (e.g., to be displayed in a display space), the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations of the SR content (e.g., in the display space). The method includes processing the warped image in the warped space based on the plurality of respective scaling factors to generate a processed warped image and transmitting the processed warped image.

21 Claims, 26 Drawing Sheets

Related U.S. Application Data

(60) Provisional application No. 62/667,733, filed on May 7, 2018.

(58) Field of Classification Search
CPC ........... H04N 21/21805; H04N 21/631; H04N 21/816; H04N 19/597; H04N 19/167; H04N 19/119

See application file for complete search history.

(56) References Cited

U.S. PATENT DOCUMENTS

| | | | |
|---|---|---|---|
| 11,294,815 B2* | 4/2022 | Kreinin | .................. G06F 9/345 |
| 2005/0018911 A1* | 1/2005 | Deever | ............... H04N 19/126 |
| | | | 375/E7.14 |
| 2011/0142138 A1 | 6/2011 | Tian et al. | |
| 2017/0339392 A1 | 11/2017 | Forutanpour et al. | |
| 2018/0081429 A1 | 3/2018 | Akenine-Moller et al. | |
| 2018/0136720 A1* | 5/2018 | Spitzer | ...................... G06T 3/40 |
| 2018/0190091 A1* | 7/2018 | Yuan | ..................... H04N 7/181 |
| 2018/0350032 A1* | 12/2018 | Bastani | ................... G06T 15/20 |
| 2020/0058152 A1* | 2/2020 | Zhang | .................... G06F 3/011 |
| 2022/0004012 A1* | 1/2022 | Dahlberg | ............. G01S 7/4817 |

FOREIGN PATENT DOCUMENTS

| | | | | |
|---|---|---|---|---|
| DE | 202017105882 U1 | 4/2018 | | |
| EP | 3111640 B1 | 5/2019 | | |
| KR | 10-20170048137 A | 5/2017 | | |
| WO | 2017200721 A1 | 11/2017 | | |
| WO | 2018/041244 A1 | 3/2018 | | |
| WO | 2018/200993 A1 | 11/2018 | | |
| WO | WO-2019217260 A1 * | 11/2019 | ......... G02B 27/0093 |
| WO | WO-2019217261 A1 * | 11/2019 | ........... G06T 15/205 |
| WO | WO-2019217262 A1 * | 11/2019 | ......... G02B 27/0093 |
| WO | WO-2019217264 A1 * | 11/2019 | |
| WO | WO-2020141344 A2 * | 7/2020 | ......... G02B 27/0093 |

OTHER PUBLICATIONS

Korean Rejection Decision Dated Mar. 21, 2022, Korean Application No. 10-2020-7032180, pp. 1-6.

Examination Report dated Sep. 7, 2022, Indian Patent Application No. 202017053098, pp. 1-7.

Chinese Office Action dated Feb. 23, 2024, Chinese Patent Application No. 201980030981.5, pp. 1-17.

* cited by examiner

2000

Receive a warped image representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in a display space —2010

Generate, based on the warped image, the plurality of respective scaling factors, and a distortion function describing distortion caused by an eyepiece, a lens-compensated warped image that is a version of the warped image distorted in an inverse relationship to the distortion caused by the eyepiece —2020

Figure 20

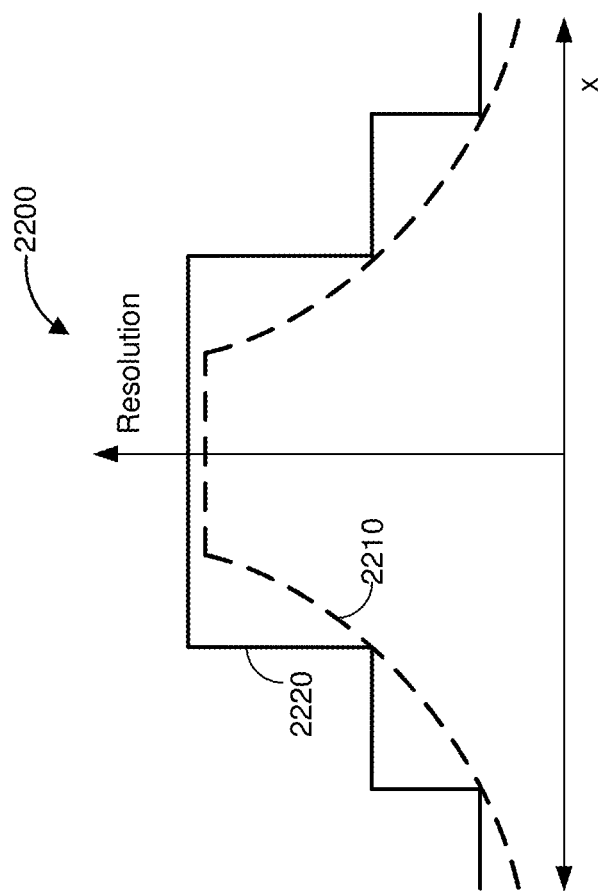

DYNAMIC FOVEATED PIPELINE

CROSS-REFERENCES TO RELATED APPLICATIONS

This application is a continuation application of U.S. Non-Provisional patent application Ser. No. 17/053,181, filed on Nov. 5, 2020, which is a national phase entry of Intl. Patent App. No. PCT/US2019/030819, filed on May 6, 2019, which claims priority to U.S. Provisional Patent App. No. 62/667,733, filed on May 7, 2018, which are hereby incorporated by reference in their entireties.

TECHNICAL FIELD

The present disclosure generally relates to image rendering, and in particular, to systems, methods, and devices for rendering images for simulated reality with a varying amount of detail.

BACKGROUND

A physical setting refers to a world that individuals can sense and/or with which individuals can interact without assistance of electronic systems. Physical settings (e.g., a physical forest) include physical elements (e.g., physical trees, physical structures, and physical animals). Individuals can directly interact with and/or sense the physical setting, such as through touch, sight, smell, hearing, and taste.

In contrast, a simulated reality (SR) setting refers to an entirely or partly computer-created setting that individuals can sense and/or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with and/or sense a SR object using any one of his senses, including touch, smell, sight, taste, and sound. For example, an individual may interact with and/or sense aural objects that create a multi-dimensional (e.g., three dimensional) or spatial aural setting, and/or enable aural transparency. Multi-dimensional or spatial aural settings provide an individual with a perception of discrete aural sources in multi-dimensional space. Aural transparency selectively incorporates sounds from the physical setting, either with or without computer-created audio. In some SR settings, an individual may interact with and/or sense only aural objects.

One example of SR is virtual reality (VR). A VR setting refers to a simulated setting that is designed only to include computer-created sensory inputs for at least one of the senses. A VR setting includes multiple virtual objects with which an individual may interact and/or sense. An individual may interact and/or sense virtual objects in the VR setting through a simulation of a subset of the individual's actions within the computer-created setting, and/or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation and/or location with respect to the physical setting to enable interaction between virtual objects and real objects (which are physical elements from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical element captured by imaging sensor(s). In another example, a virtual object may exhibit characteristics consistent with actual weather conditions in the physical setting, as identified via imaging, weather-related sensors, and/or online weather data. In yet another example, an augmented reality forest may have virtual trees and structures, but the animals may have features that are accurately reproduced from images taken of physical animals.

Many electronic systems enable an individual to interact with and/or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) and/or microphones for taking images/video and/or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Rendering an image for an SR experience can be computationally expensive. Accordingly, to reduce this computational burden, advantage is taken of the fact that humans typically have relatively weak peripheral vision. Accordingly, different portions of the image are rendered on a display panel with different resolutions. For example, in various implementations, portions corresponding to a user's field of focus are rendered with higher resolution than portions corresponding to a user's periphery.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 20 is a flowchart representation of a method of predistorting an image in accordance with some implementations.

FIG. 22 illustrates a graph of example resolution functions defined by scaling factors and resolution zones in accordance with some implementations.

Figure 1:
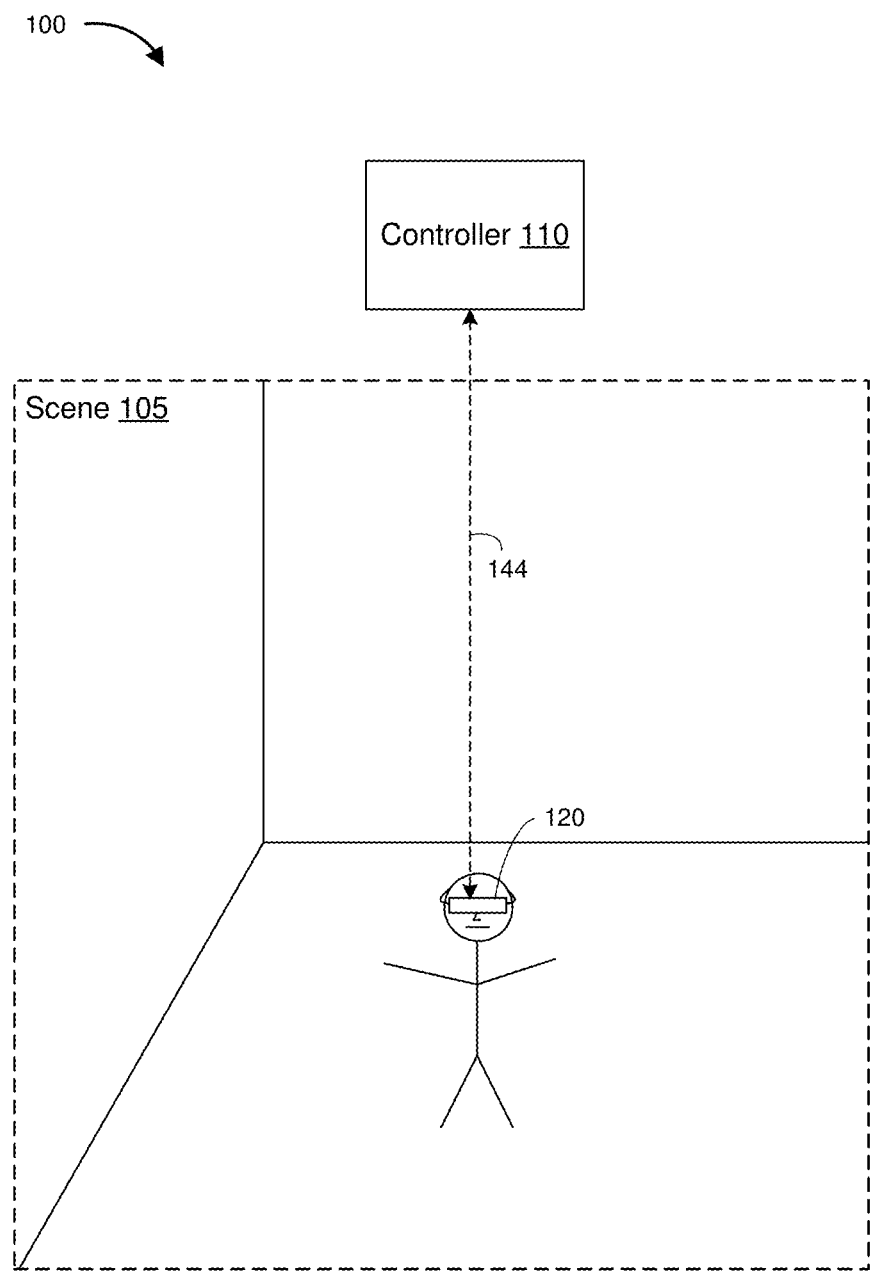
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for processing an image in a warped space. The method includes receiving a warped image representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in the display space. The method includes processing the warped image in the warped space based on the plurality of respective scaling factors to generate a processed warped image and transmitting the processed warped image.

Various implementations disclosed herein include devices, systems, and methods for processing an image based on a plurality of scaling factors. In one implementation, a method includes receiving a warped image representing simulated reality (SR) content, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations of the SR content. The method includes processing the warped image based on the plurality of respective scaling factors to generate a processed warped image and transmitting the processed warped image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As noted above, in various implementations, different portions of an image are rendered on a display panel with different resolutions. Various methods of determining the resolution for different portions of an image based on a number of factors are described below.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate a simulated reality (SR) experience for the user. In some implementations, the controller 110 includes a suitable combination of software, firmware, and/or hardware. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to present the SR experience to the user. In some implementations, the HMD 120 includes a suitable combination of software, firmware, and/or hardware. In some implementations, the functionalities of the controller 110 are provided by and/or combined with the HMD 120.

According to some implementations, the HMD 120 provides an SR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more SR displays provided to display the SR content, optionally through an eyepiece or other optical lens system. For example, in various implementations, the HMD 120 encloses the field-of-view of the user. In some implementations, the HMD 120 is replaced with a handheld device (such as a smartphone or tablet) configured to present SR content in which the user does not wear the HMD 120, but holds the device with a display directed towards the field-of-view of the user and a camera directed towards the scene 105. In some implementations, the handheld device can be placed within an enclosure that can be worn on the head of the user. In some implementations, the HMD 120 is replaced with an SR chamber, enclosure, or room configured to present SR content, wherein the user does not wear or hold the HMD 120.

Figure 2:
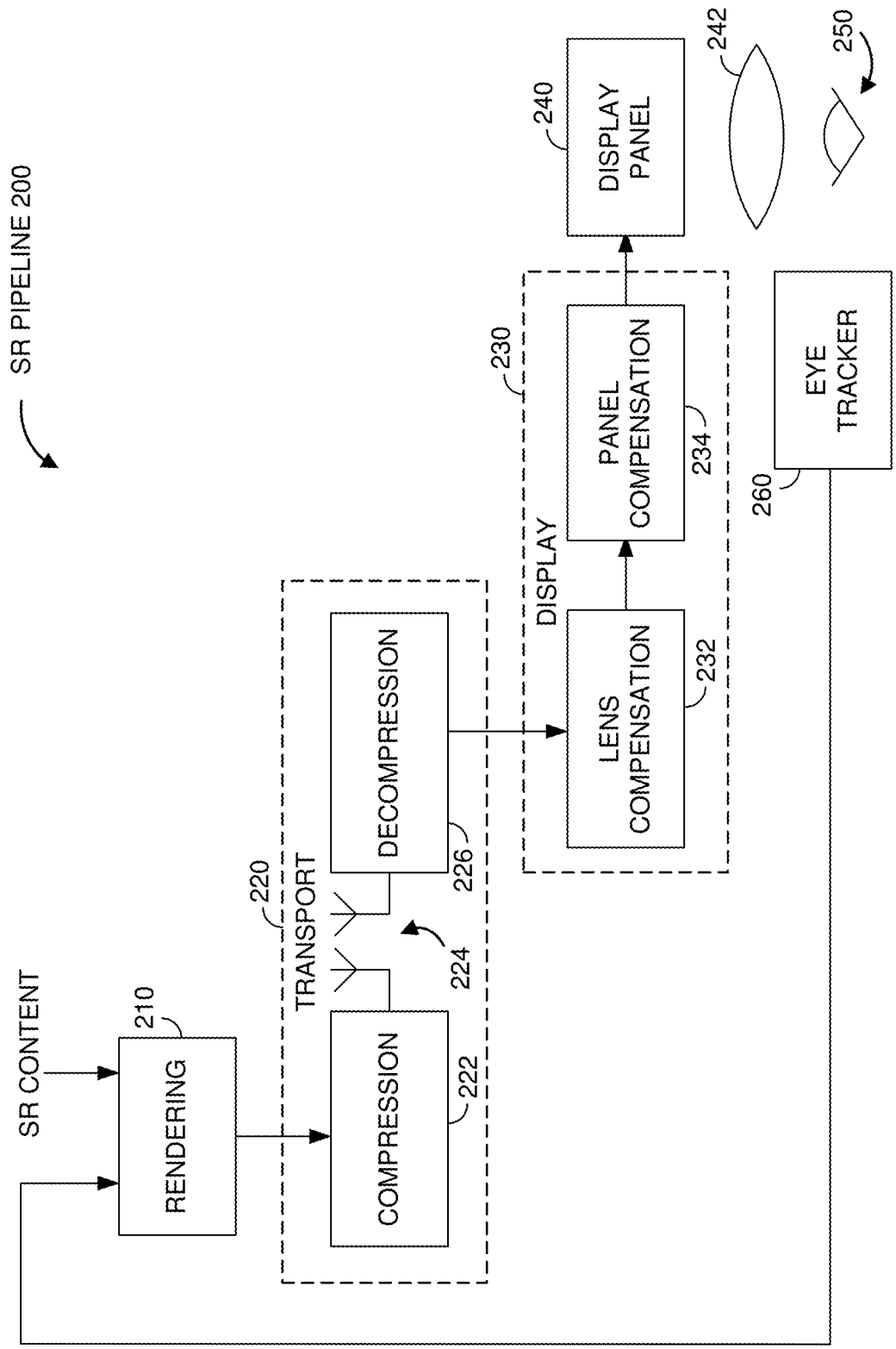
FIG. 2 illustrates an SR pipeline that receives SR content and displays an image on a display panel based on the SR content in accordance with some implementations.

In various implementations, the HMD 120 includes an SR pipeline that presents the SR content. FIG. 2 illustrates an SR pipeline 200 that receives SR content and displays an image on a display panel 240 based on the SR content.

The SR pipeline 200 includes a rendering module 210 that receives the SR content (and eye tracking data from an eye tracker 260) and renders an image based on the SR content. In various implementations, SR content includes definitions of geometric shapes of virtual objects, colors and/or textures of virtual objects, images (such as a see-through image of the scene), and other information describing content to be represented in the rendered image.

An image includes a matrix of pixels, each pixel having a corresponding pixel value and a corresponding pixel location. In various implementations, the pixel values range from 0 to 255. In various implementations, each pixel value is a color triplet including three values corresponding to three color channels. For example, in one implementation, an image is an RGB image and each pixel value includes a red value, a green value, and a blue value. As another example, in one implementation, an image is a YUV image and each pixel value includes a luminance value and two chroma values. In various implementations, the image is a YUV444 image in which each chroma value is associated with one pixel. In various implementations, the image is a YUV420 image in which each chroma value is associated with a 2×2 block of pixels (e.g., the chroma values are downsampled). In some implementations, an image includes a matrix of tiles, each tile having a corresponding tile location and including a block of pixels with corresponding pixel values. In some implementations, each tile is a 32×32 block of pixels. While specific pixel values, image formats, and tile sizes are provided, it should be appreciated that other values, format, and tile sizes may be used.

The image rendered by the rendering module 210 (e.g., the rendered image) is provided to a transport module 220 that couples the rendering module 210 to a display module 230. The transport module 220 includes a compression module 222 that compresses the rendered image (resulting in a compressed image), a communications channel 224 that carries the compressed image, and a decompression module 226 that decompresses the compressed image (resulting in a decompressed image).

The decompressed image is provided to a display module 230 that converts the decompressed image into panel data. The panel data is provided to a display panel 240 that displays a displayed image as described by (e.g., according to) the panel data. The display module 230 includes a lens compensation module 232 that compensates for distortion caused by an eyepiece 242 of the HMD. For example, in various implementations, the lens compensation module 232 predistorts the decompressed image in an inverse relationship to the distortion caused by the eyepiece 242 such that the displayed image, when viewed through the eyepiece 242 by a user 250, appears undistorted. The display module 230 also includes a panel compensation module 234 that converts image data into panel data to be read by the display panel 240.

The eyepiece 242 limits the resolution that can be perceived by the user 250. In various implementations, the maximum resolution that the eyepiece 242 can support is expressed as an eyepiece resolution function that varies as a function of distance from an origin of the display space. In various implementations, the maximum resolution that the eyepiece 242 can support is expressed as an eyepiece resolution function that varies as a function of an angle between the optical axis of the user 250 and the optical axis when the user 250 is looking at the center of the eyepiece 242. In various implementations, the maximum resolution that the eyepiece 242 can support is expressed as an eyepiece resolution function that varies as a function an angle between the optical axis of the user 250 and the optical axis when the user 250 is looking at the center of the display panel 240.

The display panel 240 includes a matrix of M×N pixels located at respective locations in a display space. The display panel 240 displays the displayed image by emitting light from each of the pixels as described by (e.g., according to) the panel data.

In various implementations, the SR pipeline 200 includes an eye tracker 260 that generates eye tracking data indicative of a gaze of the user 250. In various implementations, the eye tracking data includes data indicative of a fixation point of the user 250 on the display panel 240. In various implementations, the eye tracking data includes data indicative of a gaze angle of the user 250, such as the angle between the current optical axis of the user 250 and the optical axis when the user 250 is looking at the center of the display panel 240.

In one implementation, in order to render an image for display on the display panel 240, the rendering module 210 generates M×N pixel values for each pixel of an M×N image. Thus, each pixel of the rendered image corresponds to a pixel of the display panel 240 with a corresponding location in the display space. Thus, the rendering module 210 generates a pixel value for M×N pixel locations uniformly spaced in a grid pattern in the display space. Equivalently, the rendering module 210 generates a tile of T×T pixels, each pixel having a corresponding pixel value, at M/T×N/T tile locations uniformly spaced in a grid pattern in the display space.

Rendering M×N pixel values can be computationally expensive. Further, as the size of the rendered image increases, so does the amount of processing needed to compress the image at the compression module 222, the amount of bandwidth needed to transport the compressed image across the communications channel 224, and the amount of processing needed to decompress the compressed image at the decompression module 226.

In various implementations, in order to decrease the size of the rendered image without degrading the user experience, foveation (e.g. foveated imaging) is used. Foveation is a digital image processing technique in which the image resolution, or amount of detail, varies across an image. Thus, a foveated image has different resolutions at different parts of the image. Humans typically have relatively weak peripheral vision. According to one model, resolvable resolution for a user is maximum over a field of fixation (e.g., where the user is gazing) and falls off in an inverse linear fashion. Accordingly, in one implementation, the displayed image displayed by the display panel 240 is a foveated image having a maximum resolution at a field of focus and a resolution that decreases in an inverse linear fashion in proportion to the distance from the field of focus.

Because some portions of the image have a lower resolution, an M×N foveated image includes less information than an M×N unfoveated image. Thus, in various implementations, the rendering module 210 generates, as a rendered image, a foveated image. The rendering module 210 can generate an M×N foveated image more quickly and with less processing power (and battery power) than the rendering module 210 can generate an M×N unfoveated image. Also, an M×N foveated image can be expressed with less data than an M×N unfoveated image. In other words, an M×N foveated image file is smaller in size than an M×N unfoveated image file. In various implementations, compressing an M×N foveated image using various compression techniques results in fewer bits than compressing an M×N unfoveated image.

A foveation ratio, R, can be defined as the amount of information in the M×N unfoveated image divided by the amount of information in the M×N foveated image. In various implementations, the foveation ratio is between 1.5 and 10. For example, in some implementations, the foveation ratio is 2. In some implementations, the foveation ratio is 3 or 4. In some implementations, the foveation ratio is constant among images. In some implementations, the foveation ratio is selected based on the image being rendered.

In some implementations, in order to render an image for display on the display panel 240, the rendering module 210 generates M/R×N/R pixel values for each pixel of an M/R×N/R warped image. Each pixel of the warped image corresponds to an area greater than a pixel of the display panel 240 at a corresponding location in the display space. Thus, the rendering module 210 generates a pixel value for each of M/R×N/R locations in the display space that are not uniformly distributed in a grid pattern. Similarly, in some implementations, the rendering module 210 generates a tile of T×T pixels, each pixel having a corresponding pixel value, at each of M/(RT)×N/(RT) locations in the display space that are not uniformly distributed in a grid pattern. The respective area in the display space corresponding to each pixel value (or each tile) is defined by the corresponding location in the display space (a rendering location) and a scaling factor (or a set of a horizontal scaling factor and a vertical scaling factor).

In various implementations, the rendering module 210 generates, as a rendered image, a warped image. In various implementations, the warped image includes a matrix of M/R×N/R pixel values for M/R×N/R locations uniformly spaced in a grid pattern in a warped space that is different than the display space. Particularly, the warped image includes a matrix of M/R×N/R pixel values for M/R×N/R locations in the display space that are not uniformly distributed in a grid pattern. Thus, whereas the resolution of the warped image is uniform in the warped space, the resolution varies in the display space. This is described in greater detail below with respect to FIGS. 8A and 8B.

The rendering module 210 determines the rendering locations and the corresponding scaling factors based on a rendering resolution function that generally characterizes the resolution of the rendered image in the displayed space.

In one implementation, the rendering resolution function, S(x), is a function of a distance from an origin of the display space (which may correspond to the center of the display panel 240). In another implementation, the rendering resolution function, S(θ), is a function of an angle between an optical axis of the user 250 and the optical axis when the user 250 is looking at the center of the display panel 240. Thus, in one implementation, the rendering resolution function, S(θ), is expressed in pixels per degree (PPD).

Humans typically have relatively weak peripheral vision. According to one model, resolvable resolution for a user is maximum over a field of focus (where the user is gazing) and falls off in an inverse linear fashion as the angle increases from the optical axis. Accordingly, in one implementation, the rendering resolution function (in a first dimension) is defined as:

$$S(\theta) = \begin{cases} S_{max} & \text{for } |\theta - \theta_{fof}| < 0 \\ S_{min} + \dfrac{S_{max} - S_{min}}{1 + w(|\theta - \theta_{fof}|)} & \text{for } |\theta - \theta_{fof}| \geq 0 \end{cases},$$

where $S_{max}$ is the maximum of the rendering resolution function (e.g., approximately 60 PPD), $S_{min}$ is the asymptote of the rendering resolution function, $\theta_{fof}$ characterizes the size of the field of focus, and w characterizes the width of the rendering resolution function.

Figure 3A:
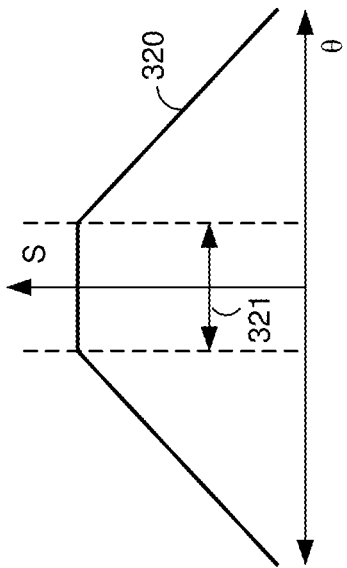
FIGS. 3A-3D illustrate various rendering resolution functions in a first dimension in accordance with various implementations.
Figure 3B:
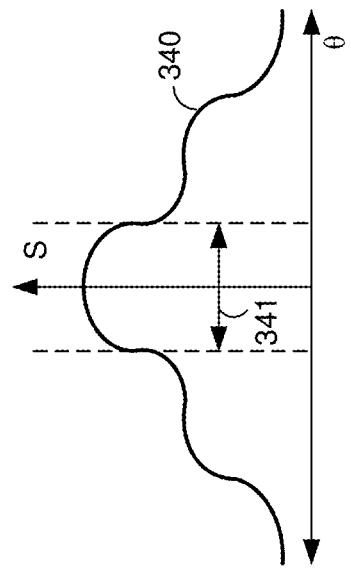
Figure 3C:
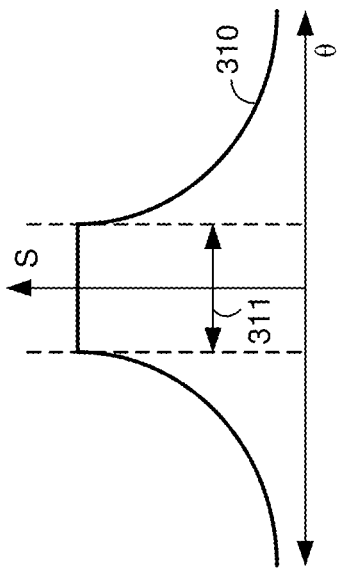
Figure 3D:
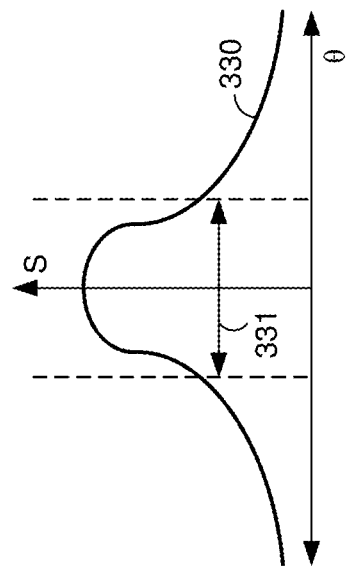

FIG. 3A illustrates a rendering resolution function 310 (in a first dimension) which falls off in an inverse linear fashion from a field of focus. FIG. 3B illustrates a rendering resolution function 320 (in a first dimension) which falls off in a linear fashion from a field of focus. FIG. 3C illustrates a rendering resolution function 330 (in a first dimension) which is approximately Gaussian. FIG. 3D illustrates a rendering resolution function 340 (in a first dimension) which falls off in a rounded stepwise fashion.

Each of the rendering resolutions functions 310-340 of FIGS. 3A-3D is in the form a peak including a peak height (e.g., a maximum value) and a peak width. The peak width can be defined in a number of ways. In one implementation, the peak width is defined as the size of the field of focus (as illustrated by width 311 of FIG. 3A and width 321 of FIG. 3B). In one implementation, the peak width is defined as the full width at half maximum (as illustrated by width 331 of FIG. 3C). In one implementation, the peak width is defined as the distance between the two inflection points nearest the origin (as illustrated by width 341 of FIG. 3D).

Figure 4A:
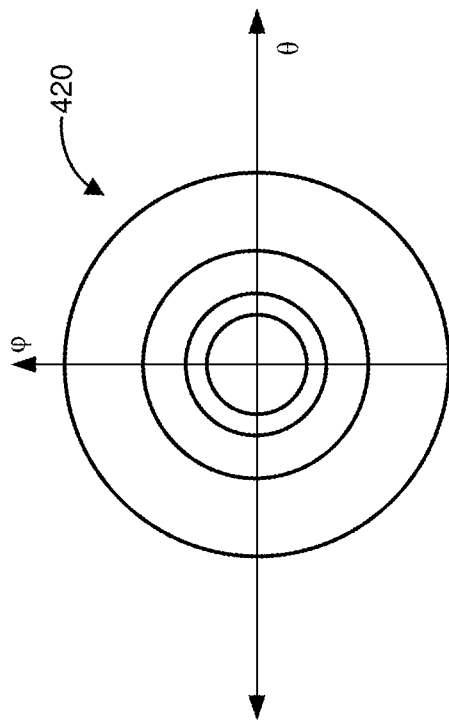
FIGS. 4A-4D illustrate various two-dimensional rendering resolution functions in accordance with various implementations.
Figure 4B:
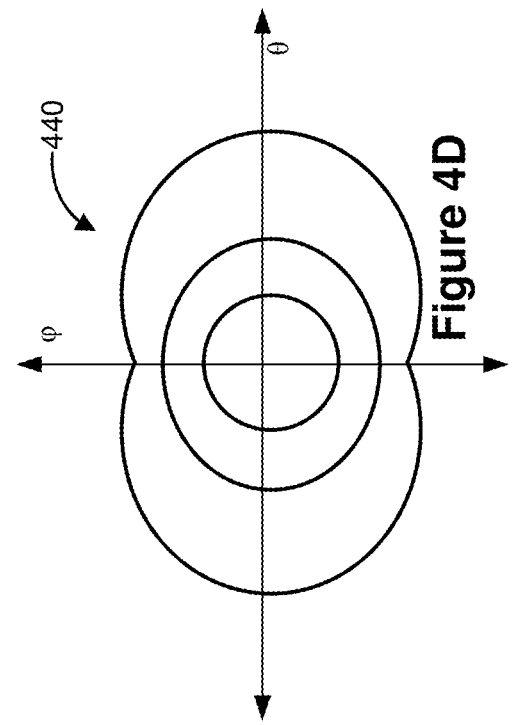
Figure 4C:
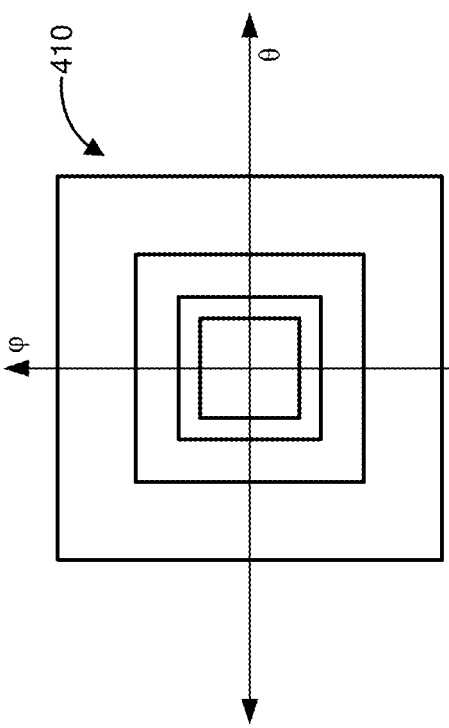
Figure 4D:
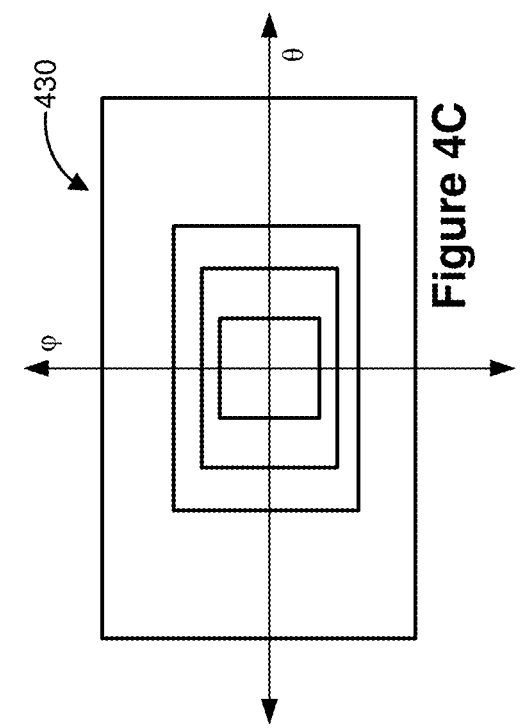

Whereas FIGS. 3A-3D illustrate rendering resolution functions in a single dimension, it is to be appreciated that the rendering resolution function used by the rendering module 210 can be a two-dimensional function. FIG. 4A illustrates a two-dimensional rendering resolution function 410 in which the rendering resolution function 410 is independent in a horizontal dimension (θ) and a vertical dimension (φ). FIG. 4B illustrates a two-dimensional rendering resolution function 420 in which the rendering resolution function 420 a function of single variable (e.g., D= $\sqrt{\theta^2 + \varphi^2}$). FIG. 4C illustrates a two-dimensional rendering resolution function 430 in which the rendering resolution function 430 is different in a horizontal dimension (θ) and a vertical dimension (φ). FIG. 4D illustrates a two-dimensional rendering resolution function 440 based on a human vision model.

As described in detail below, the rendering module 210 generates the rendering resolution function based on a number of factors, including biological information regarding human vision, eye tracking data, eye tracking metadata, the SR content, and various constraints (such as constraints imposed by the hardware of the HMD).

Figure 5A:
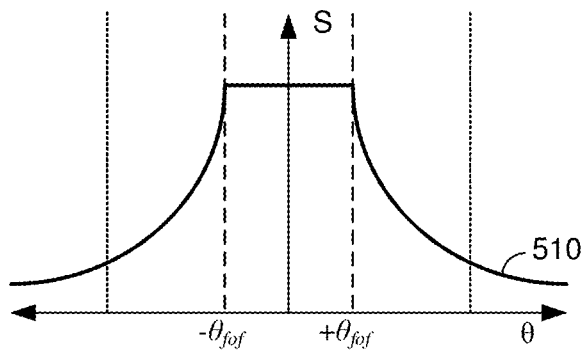
FIG. 5A illustrates an example rendering resolution function that characterizes a resolution in a display space as a function of angle in a warped space in accordance with some implementations.

FIG. 5A illustrates an example rendering resolution function 510, denoted $S(\theta)$, which characterizes a resolution in the display space as a function of angle in the warped space. The rendering resolution function 510 is a constant (e.g., $S_{max}$) within a field of focus (between $-\theta_{fof}$ and $+\theta_{fof}$) and falls off in an inverse linear fashion outside this window.

Figure 5B:
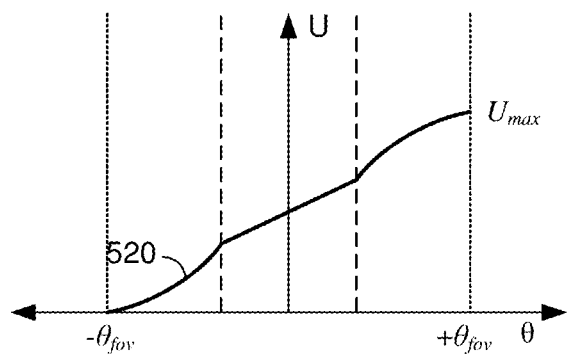
FIG. 5B illustrates the integral of the example rendering resolution function of FIG. 5A in accordance with some implementations.

FIG. 5B illustrates the integral 520, denoted $U(\theta)$, of the rendering resolution function 510 of FIG. 5A within a field of view, e.g., from $-\theta_{fov}$ to $+\theta_{fov}$. Thus, $U(\theta)=\int_{-\theta_{fov}}^{\theta} S(\check{\theta})d\check{\theta}$. The integral 520 ranges from 0 at $-\theta_{fov}$ to a maximum value, denoted $U_{max}$, at $+\theta_{fov}$.

Figure 5C:
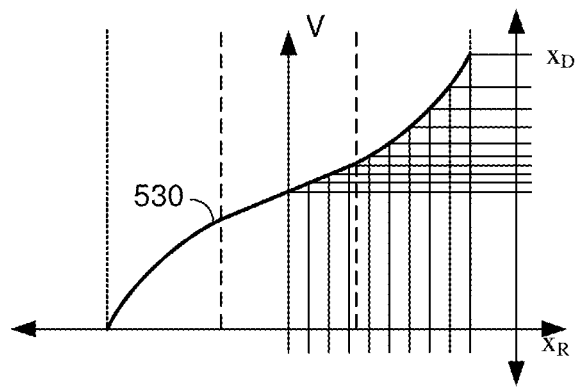
FIG. 5C illustrates the tangent of the inverse of the integral of the example rendering resolution function of FIG. 5A in accordance with some implementations.

FIG. 5C illustrates the tangent 530, denoted $V(x_R)$, of the inverse of the integral 520 of the rendering resolution 510 of FIG. 5A. Thus, $V(x_R)=\tan(U^{-1}(x_R))$. The tangent 530 illustrates a direct mapping from rendered space, in $x_R$, to display space, in $x_D$. According to the foveation indicated by the rendering resolution function 510, the uniform sampling points in the warped space (equally spaced along the $x_R$ axis) corresponding to non-uniform sampling points in the display space (non-equally spaced along the $x_D$ axis). Scaling factors can be determined by the distances between the non-uniform sampling points in the display space.

When performing static foveation, the rendering module 210 uses a rendering resolution function that does not depend on the gaze on the user. However, when performing dynamic foveation, the rendering module 210 uses a rendering resolution function that depends on the gaze of the user. In particular, when performing dynamic foveation, the rendering module 210 uses a rendering resolution function that has a peak height at a location corresponding to a location in the display space at which the user is looking (e.g., the point of fixation as determined by the eye tracker 260).

Figure 6B:
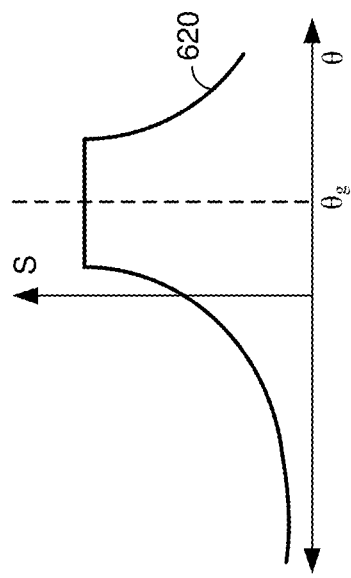
FIG. 6B illustrates an example rendering resolution function for performing dynamic foveation in accordance with some implementations.
Figure 6A:
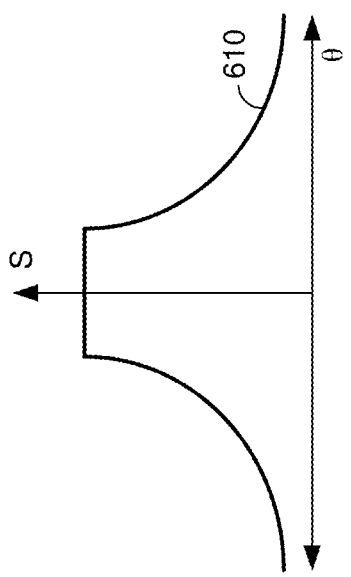
FIG. 6A illustrates an example rendering resolution function for performing static foveation in accordance with some implementations

FIG. 6A illustrates a rendering resolution function 610 that may be used by the rendering module 210 when performing static foveation. The rendering module 210 may also use the rendering resolution function 610 of FIG. 6A when performing dynamic foveation and the user is looking at the center of the display panel 240. FIG. 6B illustrates a rendering resolution function 620 that may be used by the rendering module when performing dynamic foveation and the user is looking at an angle ($\theta_g$) away from the center of the display panel 240.

Figure 7:
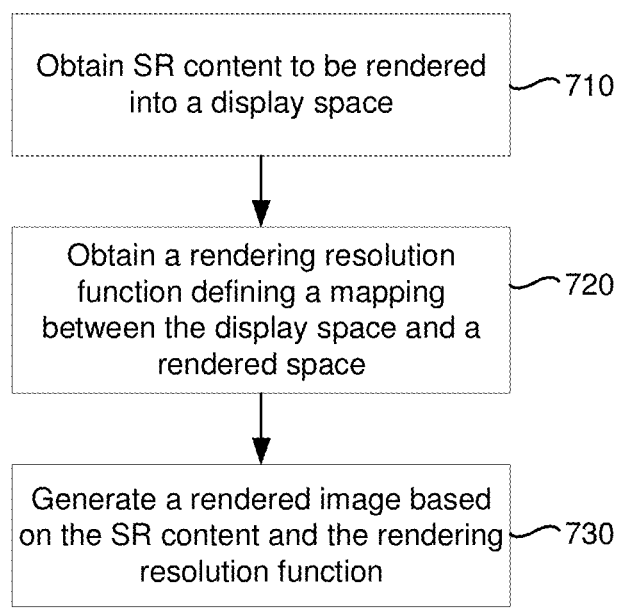
FIG. 7 is a flowchart representation of a method of rendering an image based on a rendering resolution function in accordance with some implementations.

FIG. 7 is a flowchart representation of a method 700 of rendering an image in accordance with some implementations. In some implementations (and as detailed below as an example), the method 700 is performed by a rendering module, such as the rendering module 210 of FIG. 2. In various implementations, the method 700 is performed by an HMD, such as the HMD 100 of FIG. 1, or a portion thereof, such as the SR pipeline 200 of FIG. 2. In various implementations, the method 700 is performed by a device with one or more processors, non-transitory memory, and one or more SR displays. In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins at block 710 with the rendering module obtaining SR content to be rendered into a display space. In various implementations, SR content can include definitions of geometric shapes of virtual objects, colors and/or textures of virtual objects, images (such as a see-through image of the scene), or other information describing content to be represented in the rendered image.

The method 700 continues at block 720 with the rendering module obtaining a rendering resolution function defining a mapping between the display space and a warped space. Various rendering resolution functions are illustrated in FIGS. 3A-3D and FIGS. 4A-4D. Various methods of generating a rendering resolution function are described further below.

In various implementations, the rendering resolution function generally characterizes the resolution of the rendered image in the display space. Thus, the integral of the rendering resolution function provides a mapping between the display space and the warped space (as illustrated in FIGS. 5A-5C). In one implementation, the rendering resolution function, $S(x)$, is a function of a distance from an origin of the display space. In another implementation, the rendering resolution function, $S(\theta)$, is a function of an angle between an optical axis of the user and the optical axis when the user is looking at the center of the display panel. Accordingly, the rendering resolution function characterizes a resolution in the display space as a function of angle (in the display space). Thus, in one implementation, the rendering resolution function, $S(\theta)$, is expressed in pixels per degree (PPD).

In various implementations, the rendering module performs dynamic foveation and the rendering resolution function depends on the gaze of the user. Accordingly, in some implementations, obtaining the rendering resolution function includes obtaining eye tracking data indicative of a gaze of a user, e.g., from the eye tracker 260 of FIG. 2, and generating the rendering resolution function based on the eye tracking data. In various implementations, the eye tracking data includes at least one of a data indicative of a gaze angle of the user or data indicative of a fixation point of the user. In particular, in various implementations, generating the rendering resolution function based on the eye tracking data includes generating a rendering resolution function having a peak height at a location the user is looking at, as indicated by the eye tracking data.

The method 700 continues at block 730 with the rendering module generating a rendered image based on the SR content and the rendering resolution function. The rendered image includes a warped image with a plurality of pixels at respective locations uniformly spaced in a grid pattern in the warped space. The plurality of pixels are respectively associated with a plurality of respective pixel values based on the SR content. The plurality of pixels are respectively associated with a plurality of respective scaling factors defining an area in the display space based on the rendering resolution function.

An image that is said to be in a display space has uniformly spaced regions (e.g., pixels or groups of pixels) that map to uniformly spaced regions (pixels or groups of pixels) of a display. An image that is said to be in a warped space has uniformly spaced regions (e.g., pixels or groups of pixels) that map to non-uniformly spaced regions (e.g., pixels or groups of pixels) in the display space. The relationship between uniformly spaced regions in the warped space to non-uniformly spaced regions in the display space is defined at least in part by the scaling factors. Thus, the plurality of respective scaling factors (like the rendering resolution function) define a mapping between the warped space and the display space.

In various implementations, the warped image includes a plurality of tiles at respective locations uniformly spaced in a grid pattern in the warped space and each of the plurality of tiles is associated with a respective one or more scaling factors. For example, in some implementations, each tile (including a plurality of pixels) is associated with a single horizontal scaling factor and a single vertical scaling factor. In some implementations, each tile is associated with a single scaling factor that is used for both horizontal and vertical scaling. In various implementations, each tile is a 32×32 matrix of pixels.

In various implementations, the rendering module transmits the warped image including the plurality of pixel values in association with the plurality of respective scaling factors. Accordingly, the warped image and the scaling factors, rather than a foveated image which could be generated using this information, is propagated through the pipeline.

In particular, with respect to FIG. 2, in various implementations, the rendering module 210 generates a warped image and a plurality of respective scaling factors that are transmitted by the rendering module 210. At various stages in the pipeline 200, the warped image (or a processed version of the warped image) and the plurality of respective scaling factors are received (and used in processing the warped image) by the transport module 220 (and the compression module 222 and decompression module 226 thereof) as described further below. At various stages in the pipeline 200, the warped image (or a processed version of the warped image) and the plurality of respective scaling factors are received (and used in processing the warped image) by the display module 230 (and the lens compensation module 232 and the panel compensation module 234 thereof) as described further below.

In various implementations, the rendering module generates the scaling factors based on the rendering resolution function. For example, in some implementations, the scaling factors are generated based on the rendering resolution function as described above with respect to FIGS. 5A-5C. In various implementations, generating the scaling factors includes determining the integral of the rendering resolution function. In various implementations, generating the scaling factors includes determining the tangent of the inverse of the integral of the rendering resolution function. In various implementations, generating the scaling factors includes, determining, for each of the respective locations uniformly spaced in a grid pattern in the warped space, the respective scaling factors based on the tangent of the inverse of the integral of the rendering resolution function. Accordingly, for a plurality of locations uniformly spaced in the warped space, a plurality of locations non-uniformly spaced in the display space are represented by the scaling factors.

Figure 8B:
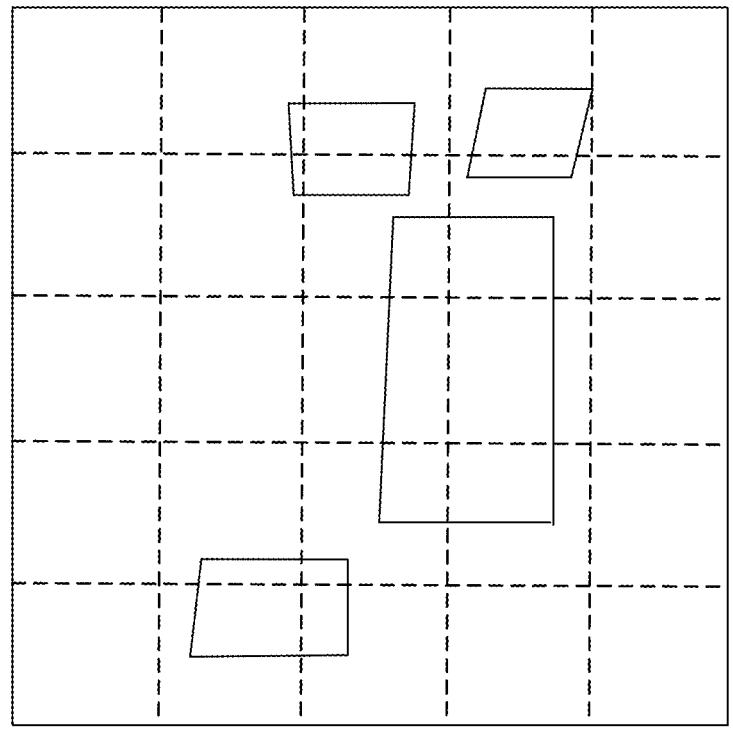
FIG. 8B illustrates a warped image of the SR content of FIG. 8A in accordance with some implementations.
Figure 8A:
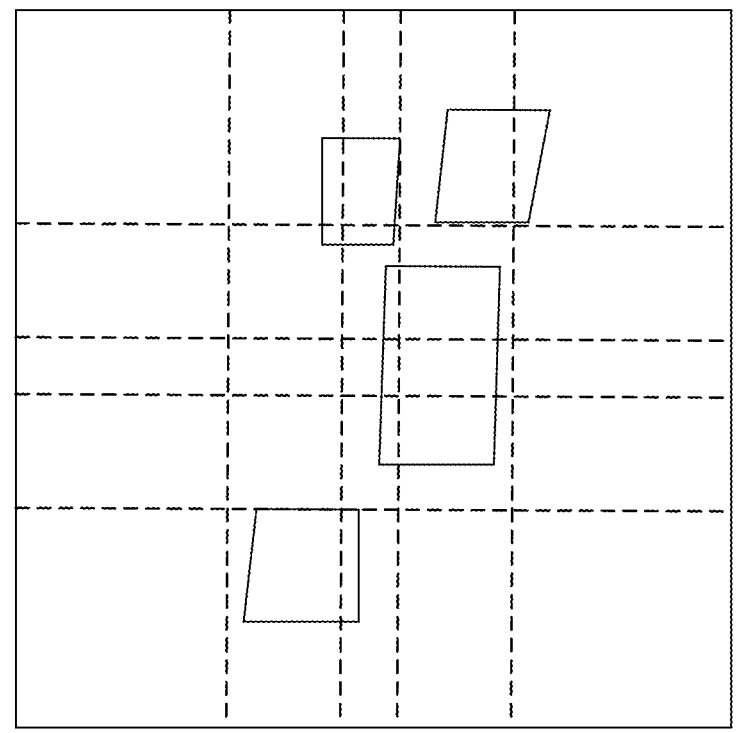
FIG. 8A illustrates an example image representation, in a display space, of SR content to be rendered in accordance with some implementations.

FIG. 8A illustrates an image representation of SR content 810 to be rendered in a display space. FIG. 8B illustrates a warped image 820 generated according to the method 700 of FIG. 7. In accordance with a rendering resolution function, different parts of the SR content 810 corresponding to non-uniformly spaced regions (e.g., different amounts of area) in the display space are rendered into uniformly spaced regions (e.g., the same amount of area) in the warped image 820.

For example, the area at the center of the image representation of SR content 810 of FIG. 8A is represented by an area in the warped image 820 of FIG. 8B including K pixels (and K pixel values). Similarly, the area on the corner of the image representation of SR content 810 of FIG. 8A (a larger area than the area at the center of FIG. 8A) is also represented by an area in the warped image 820 of FIG. 8B including K pixels (and K pixel values).

As noted above, the rendering module 210 can perform static foveation or dynamic foveation. In various implementations, the rendering module 210 determines a foveation mode to apply for rendering SR content and performs static foveation or dynamic foveation according to the determined foveation mode. In a static foveation mode, the SR content is rendered independently of eye tracking data. In a no-foveation mode, the rendered image is characterized by fixed resolutions per display regions (e.g., a constant number of pixels per tile). In a dynamic foveation mode, the resolution of the rendered image depends on the gaze of a user.

Figure 9:
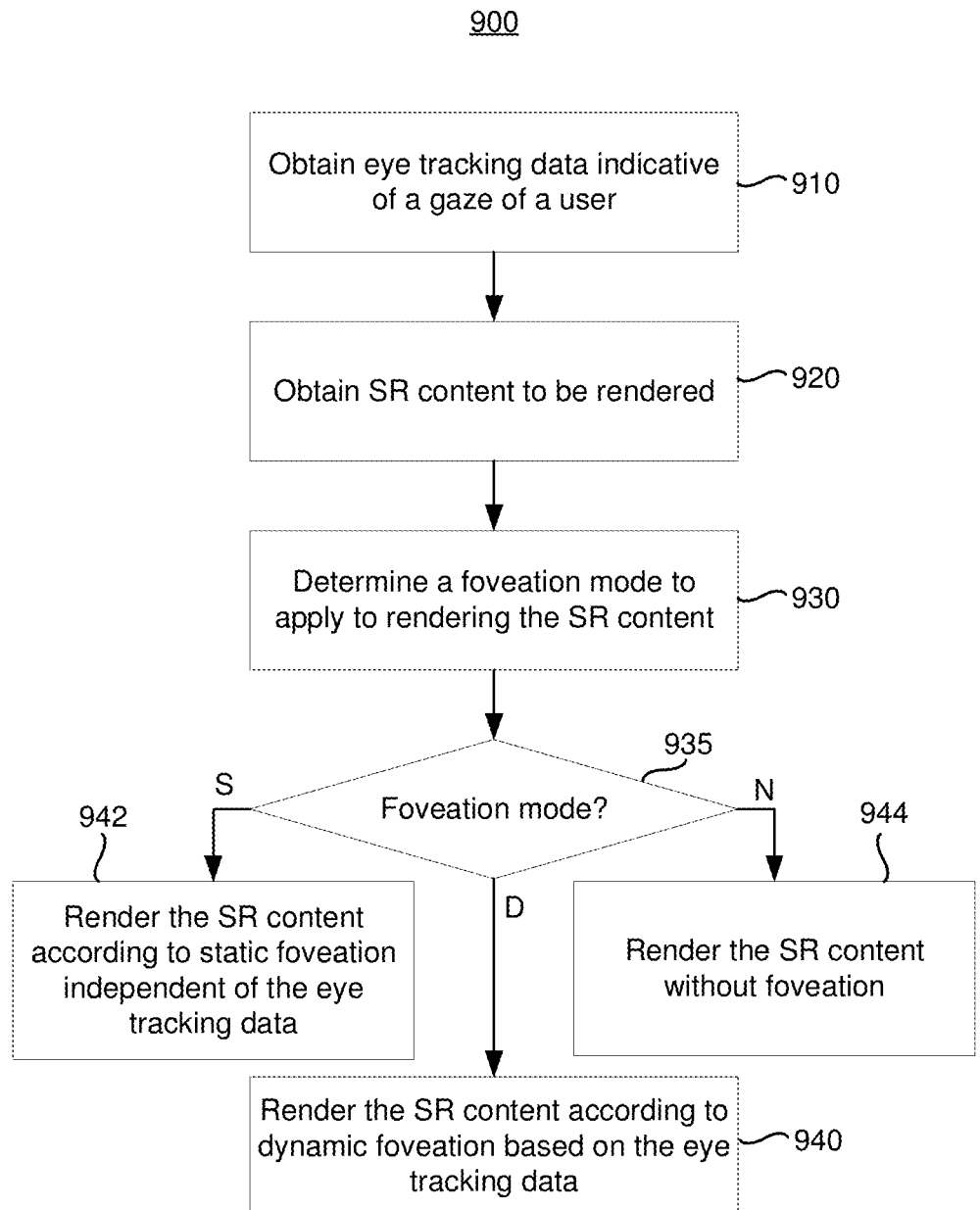
FIG. 9 is a flowchart representation of a method of rendering an image in one of a plurality of foveation modes in accordance with some implementations.

FIG. 9 is a flowchart representation of a method 900 of rendering an image in accordance with some implementations. In some implementations (and as detailed below as an example), the method 900 is performed by a rendering module, such as the rendering module 210 of FIG. 2. In various implementations, the method 900 is performed by an HMD, such as the HMD 100 of FIG. 1, or a portion thereof, such as the SR pipeline 200 of FIG. 2. In various implementations, the method 900 is performed by a device with one or more processors, non-transitory memory, and one or more SR displays. In some implementations, the method 900 is performed by processing logic, including hardware, firmware, software, or a combination thereof. In some implementations, the method 900 is performed by a processor executing instructions (e.g., code) stored in a non-transitory computer-readable medium (e.g., a memory).

The method 900 begins in block 910 with the rendering module obtaining eye tracking data indicative of a gaze of a user (e.g., where a user is looking, such as gaze direction or a fixation point of a user). In various implementations, the eye tracking data includes at least one of a data indicative of a gaze angle of the user or data indicative of a fixation point of the user.

The method 900 continues in block 920 with the rendering module obtaining SR content to be rendered. In various implementations, the SR content can include definitions of geometric shapes of virtual objects, colors and/or textures of virtual objects, images (such as a see-through image of the scene), or other information describing content to be represented in a rendered image.

The method 900 continues in block 930 with the rendering module determining a foveation mode to apply to rendering the SR content. In various implementations, the rendering module determines the foveation mode based on various factors. In some implementations, the rendering module determines the foveation mode based on a rendering processor characteristic. For example, in some implementations, the rendering module determines the foveation mode based on an available processing power, a processing speed, or a processor type of the rendering processor of the rendering module. When the rendering module has a large available processing power (due to a large processing capacity or low usage of the processing capacity), the rendering module selects a dynamic foveation mode and when the rendering module has a small available processing power (due to a small processing capacity or high usage of the processing capacity), the rendering module selects a static foveation mode or no-foveation mode. Referring to FIG. 1, when the rendering is performed by controller 110 (e.g., the rendering processor is at the controller), the rendering module selects a dynamic foveation mode and when the rendering is performed by the HMD 120 (e.g., the rendering processor is at the HMD), the rendering module selects a static foveation mode or a no-foveation mode. In various implementations, switching between static and dynamic foveation modes occurs based on characteristics of the HMD 120, such as the processing power of the HMD 120 relative to the processing power of the controller 110.

In some implementations, the rendering module selects a static foveation or a no-foveation mode when eye tracking performance (e.g., reliability) becomes sufficiently degraded. For example, in some implementations, static foveation mode or no-foveation mode is selected when eye tracking is lost. As another example, in some implementations, static foveation mode or no-foveation mode is selected when eye tracking performance breaches a threshold, such as when eye tracking accuracy falls too low (e.g., due to large gaps in eye tracking data) and/or latency related to eye tracking exceeds a value. In some implementations, the rendering module shifts focus to the center of the HMD 120 and, using static foveation, gradually increases the field of fixation (FoF) when diminishment of eye tracking performance during dynamic foveation (e.g., after a timeout, as indicated by a low prediction confidence) is suspected.

In various implementations, the rendering module selects a static foveation mode or no-foveation mode in order to account for other considerations. For example, in some implementations, the rendering module selects a static foveation mode or no-foveation mode where superior eye-tracking sensor performance is desirable. As another example, in some implementations, the rendering module selects a static foveation mode or no-foveation mode when the user wearing the HMD 120 has a medical condition that prevents eye tracking or makes it sufficiently ineffective.

In various implementations, a static foveation mode or no-foveation mode is selected because it provides better performance of various aspects of the rendering imaging system. For example, in some implementations, static foveation mode or no-foveation mode provides better rate control. As another example, in some implementations, static foveation mode or no-foveation mode provides better concealment of mixed foveated and non-foveated regions (e.g. by making fainter the line demarcating the regions). As another example, in some implementations, a static foveation mode or no-foveation mode provides better display panel consumption bandwidth, by, for instance, using static grouped compensation data to maintain similar power and/or bandwidth. As yet another example, in some implementations, static foveation mode or no-foveation mode mitigates the risk of rendering undesirable visual aspects, such as flicker and/or artifacts (e.g., grouped rolling emission shear artifact).

The method 900 continues in decision block 935. In accordance with a determination that the foveation mode is a dynamic foveation mode, the method 900 continues in block 940, wherein the rendering module renders the SR content according to dynamic foveation based on the eye tracking data (e.g., as described above with respect to FIG. 7). In accordance with a determination that the foveation mode is a static foveation mode, the method 900 continues in block 942, wherein the rendering module renders the SR content according to static foveation independent of the eye tracking data (e.g., as described above with respect to FIG. 7). In accordance with a determination that the foveation mode is a no-foveation mode, the method 900 continues in block 944, wherein the rendering module renders the SR content without foveation.

In various implementations, the method 900 returns to block 920 where additional SR content is received. In various implementations, the rendering module renders different SR content with different foveation modes depending on changing circumstances. While shown in a particular order, it should be appreciated that blocks of method 900 can be performed in different orders or at the same time. For example, eye tracking data can be obtained (e.g., as in block 910) throughout the performance of method 900 and that blocks relying on that data can use any of the previously obtained (e.g., most recently obtained) eye tracking data or variants thereof (e.g., windowed average or the like).

Figure 10A:
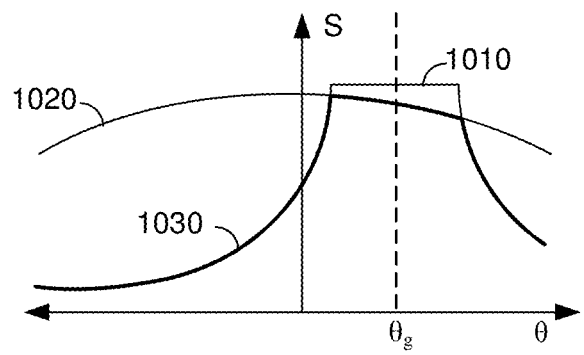
FIGS. 10A-10C illustrate various constrained rendering resolution functions in accordance with various implementations.

FIG. 10A illustrates an eyepiece resolution function 1020, $E(\theta)$, that varies as a function of angle. The eyepiece resolution function 1020 has a maximum at the center of the eyepiece 242 and falls off towards the edges. In various implementations, the eyepiece resolution function 1020 includes a portion of a circle, ellipse, parabola, or hyperbola.

FIG. 10A also illustrates an unconstrained rendering resolution function 1010, $S_u(\theta)$, that has a peak centered at a gaze angle ($\theta_g$). Around the peak, the unconstrained rendering resolution function 1010 is greater than the eyepiece resolution function 1020. Thus, if the rendering module 210 were to render an image having the resolution indicated by the unconstrained rendering resolution function 1010, details at those angles would be stripped by the eyepiece 242. Accordingly, in order to avoid the computational expense and delay in rendering those details, in various implementations, the rendering module 210 generates a capped rendering resolution function 1030 (in bold), MO), equal to the lesser of the eyepiece resolution function 1010 and the unconstrained rendering resolution function. Thus, $$S_c(\theta) = \min(E(\theta), S_u(\theta)).$$

In various implementations, the amount of computational expense and delay associated with the rendering module 210 rendering the rendered image is kept relatively constant (e.g., normalized), irrespective of the gaze angle of the user 250. Accordingly, in various implementations, the rendering module 210 renders the rendered image using a rendering resolution function that has a fixed summation value indicative of the total amount of detail in the rendered image. In various implementations, the summation value is generally equal to the integral of the rendering resolution function over the field of view. In other words, the summation value corresponds to the area under the rendering resolution function over the field of view. In various implementations, the summation value corresponds to the number of pixels, tiles, and/or (x,y) locations in the rendered image.

Figure 10B:
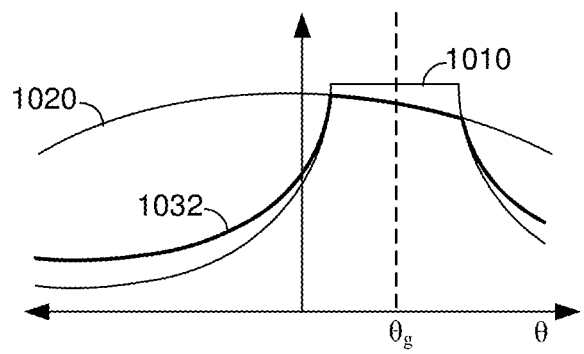
Figure 10C:
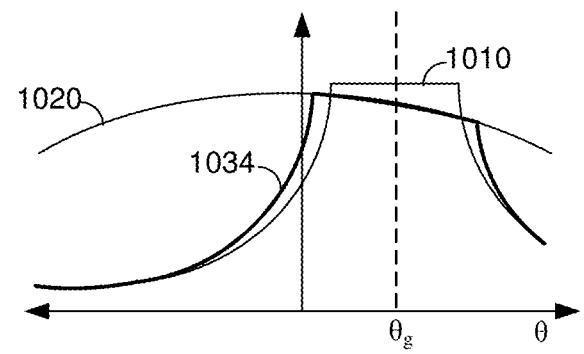

The summation value of the capped rendering resolution function 1030 is less than the summation value of the unconstrained rendering resolution function 1010. In order to generate a rendering resolution function with a greater summation value, e.g., equal to a fixed summation value, the rendering module increases values of capped rendering resolution function 1030 that were not decreased as compared to the unconstrained rendering resolution function 1010. For example, FIG. 10B illustrates a first constrained rendering resolution function 1032 in which the fall-off portions of the rendering resolution function are increased as compared to the fall-off portions of the capped rendering resolution function 1030. As another example, FIG. 10C illustrates a second constrained rendering resolution function 1034 in which the peak width of the rendering resolution function is increased as compared to the peak width of the capped rendering resolution function 1030.

Figure 11:
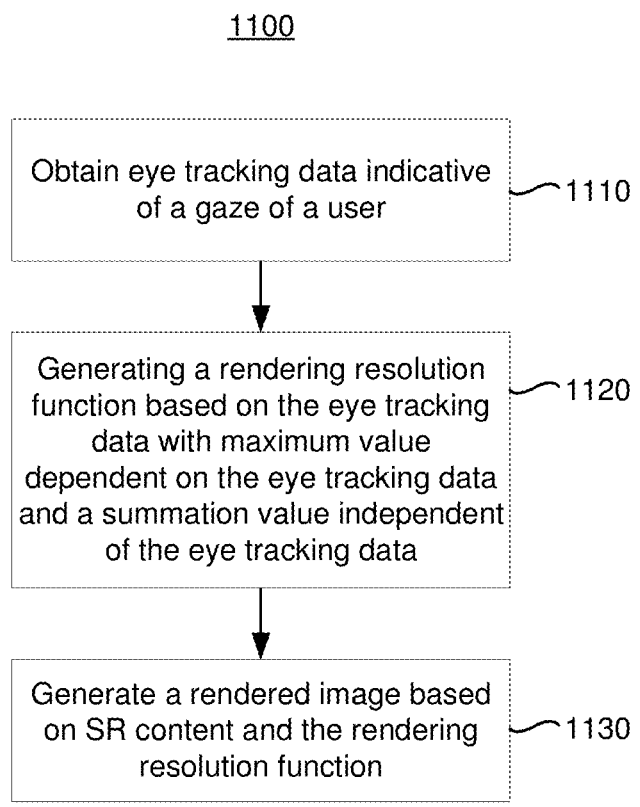
FIG. 11 is a flowchart representation of a method of rendering an image with a constrained rendering resolution function in accordance with some implementations.

FIG. 11 is a flowchart representation of a method 1100 of rendering an image in accordance with some implementations. In some implementations (and as detailed below as an example), the method 1100 is performed by a rendering module, such as the rendering module 210 of FIG. 2. In various implementations, the method 1100 is performed by an HMD, such as the HMD 100 of FIG. 1, or a portion thereof, such as the SR pipeline 200 of FIG. 2. In various implementations, the method 1100 is performed by a device with one or more processors, non-transitory memory, and one or more SR displays. In some implementations, the method 1100 is performed by processing logic, including hardware, firmware, software, or a combination thereof. In some implementations, the method 1100 is performed by a processor executing instructions (e.g., code) stored in a non-transitory computer-readable medium (e.g., a memory).

The method 1100 begins in block 1110 with the rendering module obtaining eye tracking data indicative of a gaze of a user (e.g., where the user is looking, such as gaze direction, and/or fixation point of the user). In various implementations, the rendering module receives data indicative of performance characteristics of an eyepiece at least at the gaze of the user. In various implementations, performance characteristics of the eyepiece at the gaze of the user can be determined from the eye tracking data.

The method 1110 continues in block 1120, with the rendering module generating a rendering resolution function based on the eye tracking data, the rendering resolution function having a maximum value dependent on the eye tracking data and a summation value independent of the eye tracking data.

In various implementations, generating the rendering resolution function includes generating an unconstrained rendering resolution function based on the eye tracking data (such as the unconstrained rendering resolution function 1010 of FIG. 10A); determining the maximum value (of the rendering resolution function after constraining) based on the eye tracking data (and, optionally, an eyepiece resolution function such as the eyepiece resolution function 1020 of FIG. 10A); decreasing values of the unconstrained rendering resolution function above the maximum value to the maximum value in order to generate a capped rendering resolution function (such as the capped rendering resolution function 1030 of FIG. 10A); and increasing non-decreased values of the capped rendering resolution function in order to generate the rendering resolution function. In various implementations, increasing the non-decreased values of the capped rendering resolution function includes increasing fall-off portions of the capped rendering resolution function. In some implementations, peripheral portions of the rendering resolution function fall-off in an inverse-linear fashion (e.g., hyperbolically). In various implementations, increasing the non-decreased values of the capped rendering resolution function includes increasing a peak width of the capped rendering resolution function, such as increasing the size of the field of focus.

In various implementations, the maximum value is based on a mapping between the gaze of the user and lens performance characteristics. In some implementations, the lens performance characteristics are represented by an eyepiece resolution function or a modulation transfer function (MTF). In some implementations, the lens performance characteristics are determined by surface lens modeling.

In various implementations, the maximum value is determined as a function of gaze direction (because the eyepiece resolution function varies as a function of gaze direction). In various implementations, the maximum value is based on changes in the gaze of the user, such as gaze motion (e.g., changing gaze location). For example, in some implementations, the maximum value of the rendering resolution function is decreased when the user is looking around (because resolution perception decreasing during eye motion). As another example, in some implementations, when the user blinks, the maximum value of the rendering resolution function is decreased (because resolution perception [and eye tracking confidence] decreases when the user blinks).

In various implementations, the maximum value is affected by the lens performance characteristics. For example, in some implementations, the maximum value is decreased when the lens performance characteristics indicate that the lens cannot support a higher resolution. In some implementations, the lens performance characteristics include a distortion introduced by a lens.

The method 1100 continued in block 1130, with the rendering module generating a rendered image based on SR content and the rendering resolution function (e.g., as described above with respect to FIG. 7). In various implementations, the rendered image is a foveated image, such as an image having lower resolution outside the user's field of fixation (FoF). In various implementations, the rendered image is a warped image, such as an image transformed into a non-uniform space as compared to the SR content.

Figure 12:
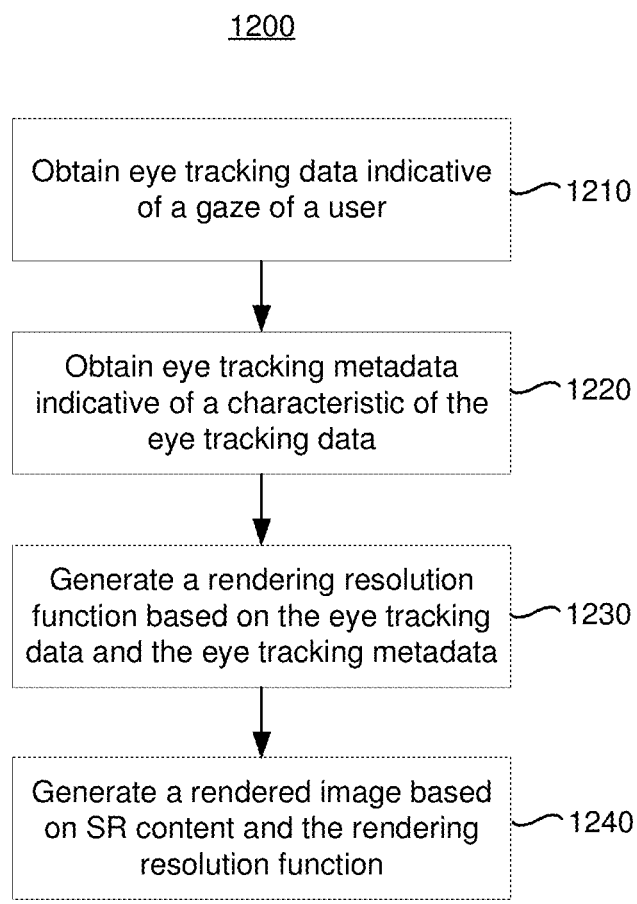
FIG. 12 is a flowchart representation of a method of rendering an image based on eye tracking metadata in accordance with some implementations.

FIG. 12 is a flowchart representation of a method 1200 of rendering an image in accordance with some implementations. In some implementations (and as detailed below as an example), the method 1200 is performed by a rendering module, such as the rendering module 210 of FIG. 2. In various implementations, the method 1200 is performed by an HMD, such as the HMD 100 of FIG. 1, or a portion thereof, such as the SR pipeline 200 of FIG. 2. In various implementations, the method 1200 is performed by a device with one or more processors, non-transitory memory, and one or more SR displays. In some implementations, the method 1200 is performed by processing logic, including hardware, firmware, software, or a combination thereof. In some implementations, the method 1200 is performed by a processor executing instructions (e.g., code) stored in a non-transitory computer-readable medium (e.g., a memory).

The method 1200 begins at block 1210 with the rendering module obtaining eye tracking data indicative of a gaze of a user (e.g., where a user is looking, such as gaze direction or a fixation point of a user). In various implementations, the eye tracking data includes at least one of a data indicative of a gaze angle of the user or data indicative of a fixation point of the user.

The method 1200 continues at block 1220 with the rendering module obtaining eye tracking metadata indicative of a characteristic of the eye tracking data. In various implementations, the eye tracking metadata is obtained in association with the corresponding eye tracking data. In various implementations, the eye tracking data and the associated eye tracking metadata are received from an eye tracker, such as eye tracker 260 of FIG. 2.

In various implementations, the eye tracking metadata includes data indicative of a confidence of the eye tracking data. For example, in various implementations, the eye tracking metadata provides a measurement of a belief that the eye tracking data correctly indicates the gaze of the user.

In various implementations, the data indicative of the confidence of the eye tracking data includes data indicative of an accuracy of the eye tracking data. In various implementations, the rendering module generates the data indicative of the accuracy of the eye tracking data based on a series of recently captured images of the eye of the user, recent measurements of the gaze of the user, user biometrics, and/or other obtained data.

In various implementations, the data indicative of the confidence of the eye tracking data includes data indicative of a latency of the eye tracking data (e.g., a difference between the time the eye tracking data is generated and the time the eye tracking data is received by the rendering module). In various implementations, the rendering module generates the data indicative of the latency of the eye tracking data based on timestamps of the eye tracking data. In various implementations, the confidence of the eye tracking data is higher when the latency is less than when the latency is more.

In various implementations, the eye tracking data includes data indicative of a prediction of the gaze of the user, and the data indicative of a confidence of the eye tracking data includes data indicative of a confidence of the prediction. In various implementations, the data indicative of a prediction of the gaze of the user is based on past measurements of the gaze of the user based on past captured images. In various implementations, the prediction of the gaze of the user is based on classifying past motion of the gaze of the user as a continuous fixation, smooth pursuit, or saccade. In various implementations, the confidence of the prediction is based on this classification. In particular, in various implementations, the confidence of the prediction is higher when past motion is classified as a continuous fixation or smooth pursuit than when the past motion is classified as a saccade.

In various implementations, the eye tracking metadata includes data indicative of one or more biometrics of the user, and, in particular, biometrics which affect the eye tracking metadata or its confidence. In particular, in various implementations, the biometrics of the user include one or more of eye anatomy, ethnicity/physionomegy, eye color, age, visual aids (e.g., corrective lenses), make-up (e.g., eyeliner or mascara), medical condition, historic gaze variation, input preferences or calibration, headset position/orientation, pupil dilation/center-shift, and/or eyelid position.

In various implementations, the eye tracking metadata includes data indicative of one or more environmental conditions of an environment of the user in which the eye tracking data was generated. In particular, in various implementations, the environmental conditions include one or more of vibration, ambient temperature, IR direction light, or IR light intensity.

The method 1200 continues at block 1230 with the rendering module generating a rendering resolution function based on the eye tracking data and the eye tracking metadata. In various implementations, the rendering module generates the rendering resolution function with a peak maximum based on the eye tracking data (e.g., the resolution is highest where the user is looking). In various implementations, the rendering module generates the rendering resolution function with a peak width based on the eye tracking metadata (e.g., with a wider peak when the eye tracking metadata indicates less confidence in the correctness of the eye tracking data).

The method 1200 continues at block 1240 with the rendering module generating a rendered image based on the SR content and the rendering resolution function (e.g., as described above with respect to FIG. 7). In various implementations, the rendered image is a foveated image, such as an image having lower resolution outside the user's field of fixation (FoF). In various implementations, the rendered image is a warped image, such as an image transformed into a non-uniform space as compared to the SR content.

Figure 13B:
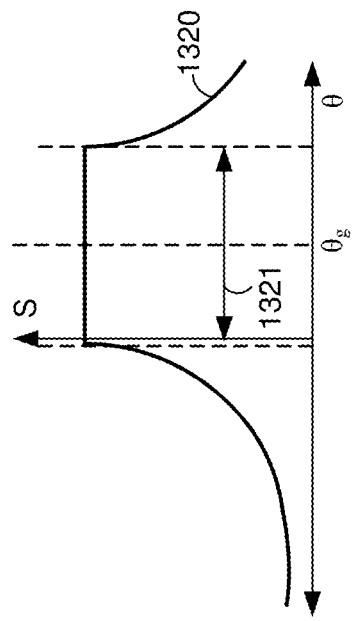
FIGS. 13A-13B illustrate various confidence-based rendering resolution functions in accordance with various implementations.
Figure 13A:
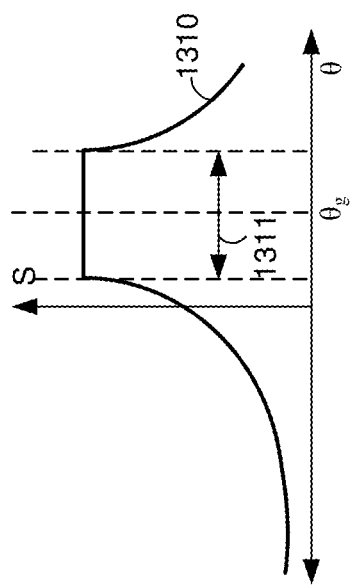

FIG. 13A illustrates a rendering resolution function 1310 that may be used by the rendering module when performing dynamic foveation, when the eye tracking data indicates that the user is looking at an angle ($\theta_g$) away from the center of the display panel, and when the eye tracking metadata indicates a first confidence resulting in a first peak width 1311. FIG. 13B illustrates a rendering resolution function 1320 that may be used by the rendering module when performing dynamic foveation, when the eye tracking data indicates that the user is looking at the angle ($\theta_g$) away from the center of the display panel, and when the eye tracking metadata indicates a second confidence, less than the first confidence, resulting in a second peak width 1321 greater than the first peak width 1311.

In various implementations, the rendering module detects loss of an eye tracking stream including the eye tracking metadata and the eye tracking data. In response, the rendering module generates a second rendering resolution function based on detecting the loss of the eye tracking stream and generates a second rendered image based on the SR content and the second rendering resolution function.

In various implementations, detecting the loss of the eye tracking stream includes determining that the gaze of the user was static at a time of the loss of the eye tracking stream. Accordingly, in various implementations, generating the second rendering resolution function includes generating the second rendering resolution function with a peak maximum at a same location as a peak maximum of the rendering resolution function and with a peak width greater than a peak width of the rendering resolution function. Thus, in various implementations, in response to detecting the loss of an eye tracking stream, the rendering resolution function stays at the same location, but the size of the field of fixation increases.

In various implementations, detecting the loss of the eye tracking stream includes determining that the gaze of the user was moving at a time of the loss of the eye tracking stream. Accordingly, in various implementations, generating the second rendering resolution function includes generating the second rendering resolution function with a peak maximum at a location displaced toward the center as compared to a peak maximum of the rendering resolution function, and with a peak width greater than a peak width of the rendering resolution function. Thus, in various implementations, in response to detecting the loss of an eye tracking stream, the rendering resolution function moves to the center of the display panel and the size of the field of fixation increases.

In various implementations, detecting the loss of the eye tracking stream includes determining that the gaze of the user was moving in a direction at a time of the loss of the eye tracking stream. Accordingly, in various implementations, generating the second rendering resolution function includes generating the second rendering resolution function with a peak maximum at a location displaced in the direction as compared to a peak maximum of the rendering resolution function, and with a peak width greater than a peak width of the rendering resolution function. Thus, in various implementations, in response to detecting the loss of an eye tracking stream, the rendering resolution function moves to a predicted location and the size of the field of fixation increases.

Figure 14:
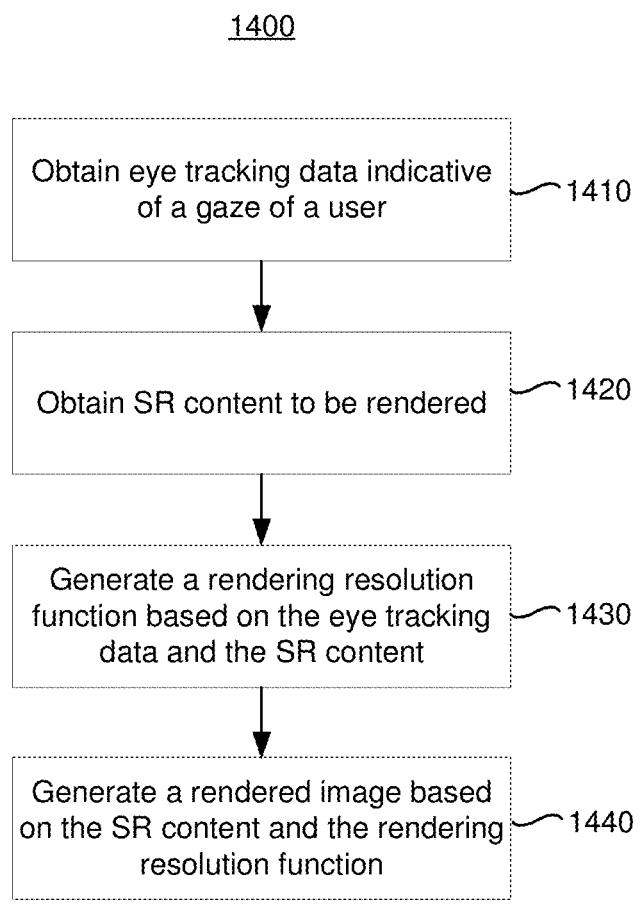
FIG. 14 is a flowchart representation of a method of rendering an image based on SR content in accordance with some implementations.

FIG. 14 is a flowchart representation of a method 1400 of rendering an image in accordance with some implementations. In some implementations (and as detailed below as an example), the method 1400 is performed by a rendering module, such as the rendering module 210 of FIG. 2. In various implementations, the method 1400 is performed by an HMD, such as the HMD 100 of FIG. 1, or a portion thereof, such as the SR pipeline 200 of FIG. 2. In various implementations, the method 1400 is performed by a device with one or more processors, non-transitory memory, and one or more SR displays. In some implementations, the method 1400 is performed by processing logic, including hardware, firmware, software, or a combination thereof. In some implementations, the method 1400 is performed by a processor executing instructions (e.g., code) stored in a non-transitory computer-readable medium (e.g., a memory).

The method 1400 begins at block 1410 with the rendering module obtaining eye tracking data indicative of a gaze of a user (e.g., where a user is looking, such as gaze direction or a fixation point of a user). In various implementations, the eye tracking data includes at least one of a data indicative of a gaze angle of the user or data indicative of a fixation point of the user.

The method 1400 continues at block 1420 with the rendering module obtaining SR content to be rendered. In various implementations, the SR content can include definitions of geometric shapes of virtual objects, colors and/or textures of virtual objects, images (such as a see-through image of the scene), or other information describing content to be represented in a rendered image.

The method 1400 continues at block 1430 with the rendering module generating a rendering resolution function based on the eye tracking data and the SR content. In various implementations, the rendering module generates the rendering resolution function with a peak maximum based on the eye tracking data (e.g., the resolution is highest where the user is looking). In various implementations, the rendering module generates the rendering resolution function based on the eye tracking data and adjusts the rendering resolution function based on the SR content. For example, in some implementations, the rendering module increases the rendering resolution function in one or more areas of import, such as a game objective or content at which humans are particularly adapted to resolve (e.g., content to which humans are likely to pay attention), like a face or high resolution object. As another example, in some implementations, the rendering module increases the rendering resolution function in one or more areas of motion (e.g., of objects of the SR content).

In various implementations, the rendering module generates the rendering resolution function based on a brightness of the SR content. For example, in some implementations, because peripheral vision is more light-sensitive than central vision, peripheral resolution is increased in darker conditions (as compared to brighter conditions). In various implementations, increasing the peripheral resolution includes increasing the peak width of the rendering resolution function and/or increasing the fall-off portions of the rendering resolution function.

In various implementations, the rendering module generates the rendering resolution function based on a color of the SR content. For example, in some implementations, because sensitivity to red-green color variations declines more steeply toward the periphery than sensitivity to luminance or blue-yellow colors, peripheral resolution is decreased when the SR content is primarily red-green as opposed to blue-yellow. In various implementations, decreasing the peripheral resolution includes decreasing the peak width of the rendering resolution function and/or decreasing the fall-off portions of the rendering resolution function.

In various implementations, generating the rendering resolution function based on the SR content (e.g., a color of the SR content) includes generating different rendering resolution functions for different color channels (e.g., three different rendering resolution functions for three different color channels, such as red, green, and blue). In particular, in various implementations, the rendering module generates a first rendering resolution function for a first color channel and a second rendering resolution function for a second color channel different than the first rendering resolution function for the first color channel. Further, in generating the rendered image (as described below), the rendering module generates a first color channel image of the rendered image based on the first rendering resolution function and a second color channel image of the rendered image based on the second rendering resolution function.

In various implementations, the rendering module generates the rendering resolution function based on a complexity of the SR content. For example, in various implementations, the rendering module increases the rendering resolution function in areas with high resolution spatial changes and/or fast spatial changes.

The method 1400 continues at block 1440 with the rendering module generating a rendered image based on the SR content and the rendering resolution function (e.g., as described above with respect to FIG. 7). In various implementations, the rendered image is a foveated image, such as an image having lower resolution outside the user's field of fixation (FoF). In various implementations, the rendered image is a warped image, such as an image transformed into a non-uniform space as compared to the SR content.

As described above with respect to FIG. 2, the rendering module 210 provides a rendered image to the transport module 220. The transport module 220 includes a compression module 222 that compresses the rendered image (resulting in a compressed image), a communications channel 224 that carries the compressed image, and a decompression module 226 that decompresses the compressed image (resulting in a decompressed image).

In various implementations, the communications channel 224 is a wired or wireless communications channel (e.g., BLUETOOTH, IEEE 802.11x, IEEE 802.16x, IEEE 802.3x, etc.). For example, in various implementations, the communications channel 224 couples a first device (e.g., the controller 110 of FIG. 1) including the rendering module 210 and the compression module 222 to a second device (e.g., the HMD 120 of FIG. 1) including the decompression module 226. In various implementations, the communications channel couples two processing units of a single device, e.g., a first processing unit including the compression module 222 and a second processing unit including the decompression module 226. In various implementations, the communications channel couples two processing modules of a single processing unit, e.g., the compression module 222 and the decompression module 226.

In various implementations, the compression module 222 receives, from the rendering module 210, a foveated image having different resolutions at different parts of the image. In various implementations, compressing an M×N foveated image using various compression techniques results in fewer bits than compressing an M×N unfoveated image.

In various implementations, the compression module 222 receives, from the rendering module 210, a warped image having a plurality of pixels at respective locations uniformly spaced in a grid pattern in a warped space. The plurality of pixels are respectively associated with a plurality of respective pixel values and a plurality of respective scaling factors indicating a plurality of respective resolutions at a plurality of respective locations in a display space.

In various implementations, the compression module 222 receives the scaling factors from the rendering module 210. In various implementations, the compression module 222 receives a single scaling factor for each pixel. In various implementations, the compression module 222 receives a horizontal scaling factor and a vertical scaling for each pixel. In various implementations, the compression module 222 receives a single scaling factor for each tile of pixels (e.g., each 32×32 block of pixels). In various implementations, the compression module 222 receives a horizontal scaling factor and a vertical scaling factor for each tile of pixels (e.g., each 32×32 block of pixels).

Because the warped image is an image (e.g., a matrix of pixel values), various conventional compression techniques can be applied to the image. However, in various implementations, the compression module 222 uses the scaling factors during the compression and/or transmission of the warped image to further reduce the bandwidth of the communication channel 224 used in transporting the warped image.

Figure 15:
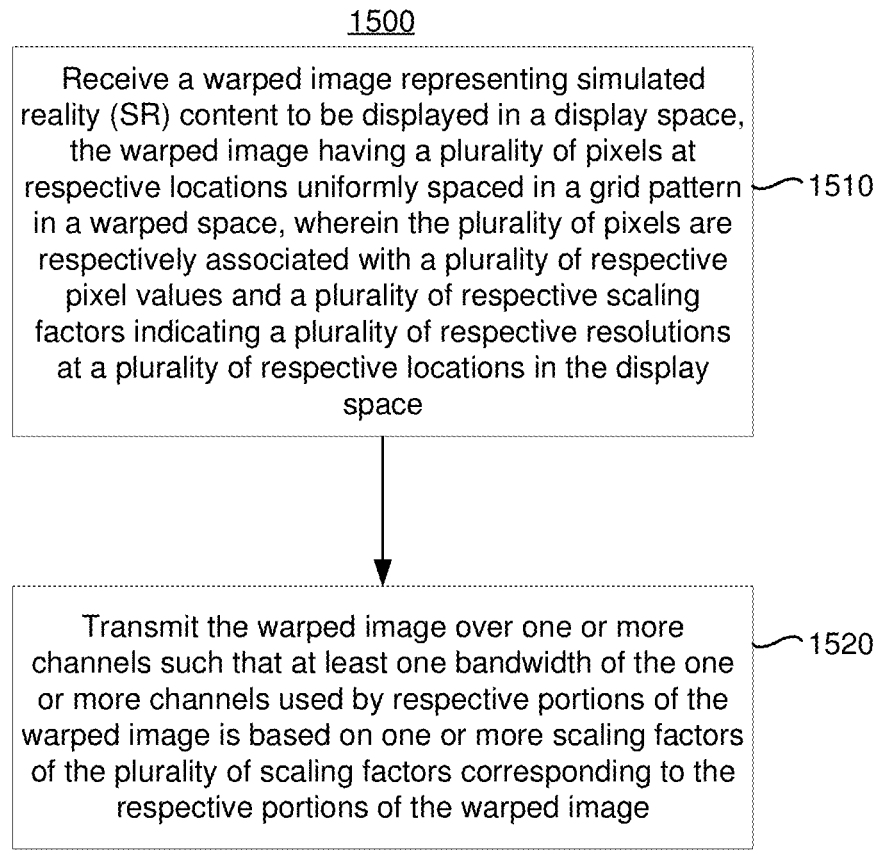
FIG. 15 is a flowchart representation of a method of transmitting an image in accordance with some implementations.

FIG. 15 is a flowchart representation of a method 1500 of transmitting an image in accordance with some implementations. In some implementations (and as detailed below as an example), the method 1500 is performed by a transport module (or portion thereof), such as the transport module 220 or compression module 222 of FIG. 2. In various implementations, the method 1500 is performed by an HMD, such as the HMD 100 of FIG. 1, or a portion thereof, such as the SR pipeline 200 of FIG. 2. In various implementations, the method 1500 is performed by a device with one or more processors, non-transitory memory, and one or more SR displays. In some implementations, the method 1500 is performed by processing logic, including hardware, firmware, software, or a combination thereof. In some implementations, the method 1500 is performed by a processor executing instructions (e.g., code) stored in a non-transitory computer-readable medium (e.g., a memory).

The method 1500 begins at block 1510 with the transport module receiving a warped image representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in the display space.

In various implementations, the plurality of respective scaling factors defines a mapping between the warped space and the display space. For example, in various implementations, different parts of the SR content corresponding to non-uniformly spaced regions in the display space are represented by uniformly spaced regions in the warped space.

In various implementations, each of the plurality of pixels is respectively associated with a separately received pixel value. In various implementations, each of the plurality of pixels is respectively associated with a separately received scaling factor (or set of horizontal scaling factor and vertical scaling factor). In various implementations, each of a plurality of tiles of the plurality of pixels is respectively associated with a separately received scaling factor (or set of horizontal scaling factor and vertical scaling factor). Accordingly, a plurality of pixels (e.g., those of a single tile) are associated with a single received scaling factor (or set of horizontal scaling factor and vertical scaling factor).

Thus, in various implementations, the warped image includes a plurality of tiles at respective locations uniformly spaced in a grid pattern in the warped space, wherein each of the plurality of tiles is associated with a respective one or more scaling factors. Also, in various implementations, one or more of the plurality of respective scaling factors include a horizontal scaling factor and a vertical scaling factor.

The method 1500 continues at block 1520 with the transport module transmitting the warped image over one or more channels such that at least one bandwidth of the one or more channels used by transmission of respective portions of the warped image is based on one or more scaling factors of the plurality of scaling factors corresponding to the respective portions of the warped image.

In various implementations, the at least one bandwidth of the one or more channels used by transmission of the respective portions is changed by compressing portions of the warped image based on the scaling factors. A more compressed portion uses less bandwidth of the channel than a less compressed portion.

In particular, in various implementations, the transport module compresses the respective portions of the warped image based on the one or more scaling factors of the plurality of scaling factors corresponding to the respective portions of the warped image. For example, in various implementations, the transport module compresses low-resolution portions more than high-resolution portions (e.g., by allocating fewer bits at a MAC layer and/or setting a quantization parameter to a lower value [e.g., more quantization]).

In various implementations, the at least one bandwidth of the one or more channels used by transmission of the respective portions is changed by error-correcting coding portions of the warped image based on the scaling factors. A portion that has been error-correcting coded with a weaker error-correcting code uses less bandwidth than a portion that has been error-correcting coded with a stronger error-correcting code.

In particular, in various implementations, the transport module error-correcting codes the respective portions of the warped image based on the one or more scaling factors of the plurality of scaling factors corresponding to the respective portions of the warped image. For example, in various implementations, the transport module uses a stronger error-correcting code for high-resolution portions than for low-resolution portions (e.g., adding more redundancy at the PHY layer).

In various implementations, the at least one bandwidth of the one or more channels used by transmission of the respective portions is changed by changing a probability of transmission (or retransmission) of portions of the warped image based on the scaling factors. When the probability of transmission (or retransmission) of a portion is less, the bandwidth used by transmission of the portion is less.

In particular, in various implementations, a probability of transmission of the respective portions of the warped image is based on the one or more scaling factors of the plurality of scaling factors corresponding to the respective portions of the warped image. In various implementations, the probability of transmission is a probability of retransmission in the case of a lost packet. For example, if a data packet corresponding to a portion of the warped image is lost over the channel, the probability of retransmitting the packet can be based on the scaling factor such that data packets corresponding to higher resolution portions are more likely to be retransmitted as compared to data packets corresponding to lower resolution portions.

In various implementations, the probability of transmission is based on a selected sub-channel. For example, by choosing a sub-channel (e.g., at the PHY layer) with a higher signal-to-noise ratio, the probability of retransmission due to a bit error, packet error, or dropped packet is reduced.

Accordingly, in various implementations, the transport module selects a sub-channel for transmission of a respective portion based on the respective scaling factor. In various implementations, the transport module selects a sub-channel with higher signal-to-noise ratio for a higher resolution portion than for a lower resolution portion.

In various implementations, the probability of transmission is based on a level of a buffer that receives image data associated with the warped image (e.g., a buffer of the decompression module 226 of FIG. 2). For example, in various implementations, when the buffer is nearing or has approached overflow, the probability of transmitting a portion of the warped image is decreased, and more so for lower resolution portions of the warped image than for higher resolution portions of the warped image. In various implementations, when the buffer is nearing or has approached overflow, the receiver (e.g., the decompressing module) discards received portions of the warped image based on the scaling factors. For example, in various implementations, the receiver is more likely to discard lower resolution portions than higher resolution portions.

In various implementations, transmitting the warped image includes transforming the warped image. For example, in various implementations, the transport module generates a wavelet warped image by wavelet transforming the warped image. The wavelet warped image includes, for each respective portion of the warped image, a plurality of portions of the wavelet warped image corresponding to different frequency bands.

Figure 16B:
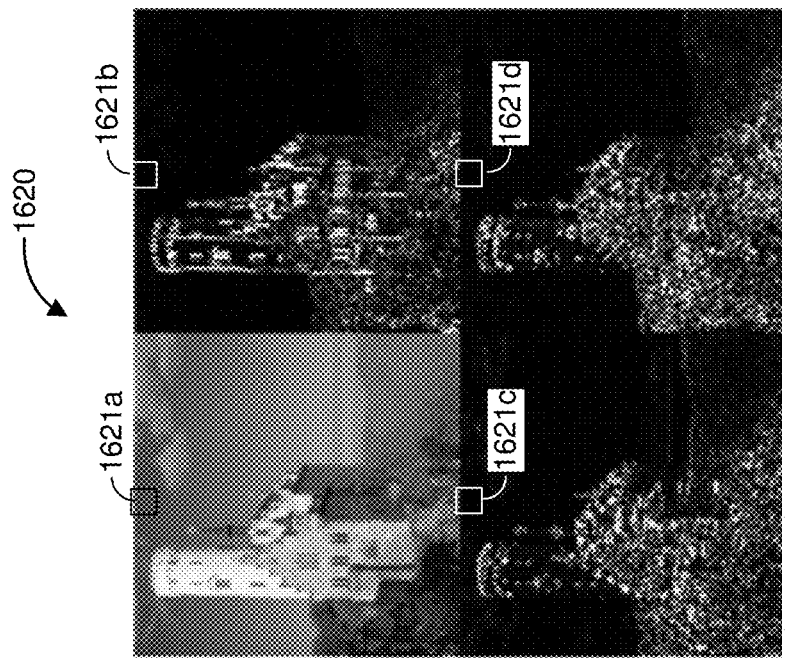
FIGS. 16A-16B illustrates an example image and a wavelet image generated by a one-layer wavelet transform of the example image.
Figure 16A:
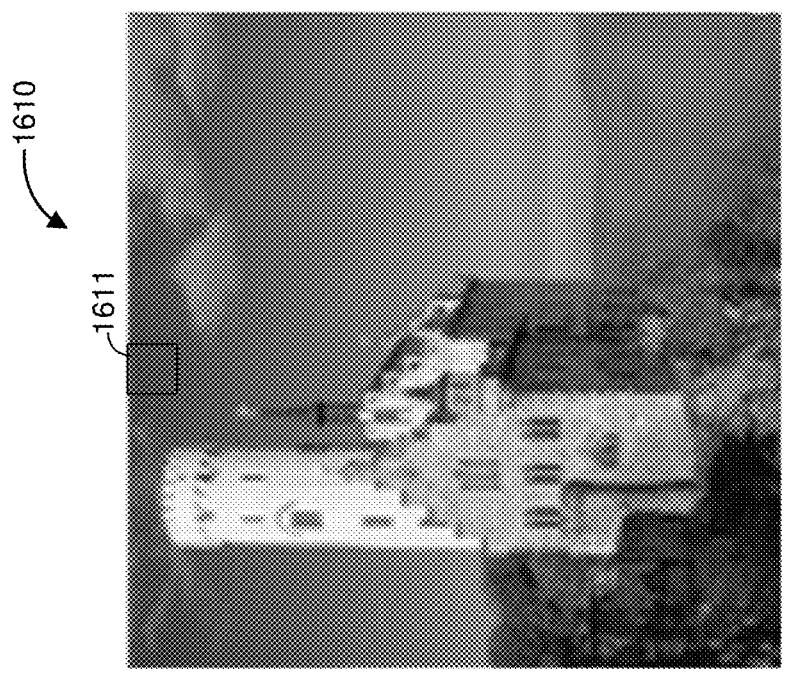

FIG. 16A illustrates an example image 1610. FIG. 16B illustrates wavelet image 1620 generated by a one-layer wavelet transform of the example image. Each portion of the example image 1610 (e.g., the top middle block 1611) is represented by a plurality of portions (e.g., blocks 1621*a*-1621*d*) of the wavelet image 1620 corresponding to different frequency bands. In particular, block 1621*a* corresponds to low-frequency in both the horizontal and vertical directions, block 1621*b* corresponds to high-frequency in the horizontal direction and low-frequency in the vertical direction, block 1621*c* corresponds to low-frequency in the horizontal direction and high-frequency in the vertical direction, and block 1021*d* corresponds to high-frequency in both the horizontal and vertical directions.

In various implementations, the wavelet warped image is a generated using a one-layer wavelet function (illustrated by FIGS. 16A-16B). In various implementations, the wavelet warped image is generated using a two-layer wavelet function.

In various implementations, the at least one bandwidth of the one or more channels used by transmission of respective portions of the wavelet warped image is based on different frequency bands. In particular, in various implementations, respective portions of the wavelet warped image associated with lower frequency bands are allocated more bandwidth than portions of the wavelet warped image associated with higher frequency bands.

In various implementations, the transport module filters the warped image based on the plurality of respective scaling factors. For example, in various implementations, the transport module wavelet-thresholds the warped image. In various circumstances, this de-noises the image based on frequency band in order to make it more comprehensible and/or remove some details to provide a continuous stream.

In various implementations, the at least one bandwidth of the one or more channels used by transmission of the respective portions of the warped image is further based on at least one available bandwidth of the one or more channels.

In particular, when the available bandwidth is greater, the bandwidth of the channel used is greater. In various implementations, the transport module includes a high-efficiency video coder (HEVC).

As noted above with respect to FIG. 2, in various implementations, the transport module 220 receives the plurality of respective scaling factors from the rendering module 210. In various implementations, the transport module 220 provides the respective scaling factors to the display module 230. Accordingly, the transport module 220 transports the respective scaling factors over the communications channel 224.

Thus, in various implementations, the method 1500 of FIG. 15 further includes receiving the plurality of respective scaling factors (e.g., from a rendering module), compressing the plurality of respective scaling factors, transmitting the plurality of respective scaling factors over the channel, decompressing the plurality of respective scaling factors, and/or providing the plurality of respective scaling factors (e.g., to a display module).

Referring to FIG. 2, the decompression module 226 receives, via the communications channel 224, the warped image. In various implementations, the warped image is compressed, encoded, and/or transformed. Accordingly, in various implementations, the decompression module 226 decompresses, decodes, and/or de-transforms the warped image. Further, in various implementations, the decompression module 226 receives, via the communications channel 224, the plurality of respective scaling factors. In various implementations, the plurality of respective scaling factors are compressed. Accordingly, in various implementations, the decompression module 226 decompresses the plurality of respective scaling factors.

In some circumstances, the decompression module 226 fails to correctly receive a data packet associated with a portion of the warped image associated with a respective scaling factor. For example, the decompression module 226 may receive a respective scaling factor, but not receive a corresponding data packet. As another example, the decompression module 226 may receive a corrupted data packet associated with a respective scaling factor (e.g., as indicated by a parity bit, cyclic redundancy check, or other indicator indicating that the data packet is corrupt). As another example, the decompression module 226 may discard packets because a buffer of the decompression module 226 is full or nearly full.

In various implementations, the decompression module 226 sends a request to the compression module 222 to retransmit the data packet that was not correctly received. In various implementations, the decompression module 226 determines whether to send such a retransmission request based on the corresponding scaling factor. For example, in various implementations, the decompression module 226 is more likely to send the retransmission request if the corresponding scaling factor indicates that the resolution of the corresponding portion of the image is higher than if the corresponding scaling factor indicates that the resolution of the corresponding portion of the image is lower.

As noted above, in various implementations, the decompression module 226 includes a buffer that stores received data packets. In some circumstances, the buffer may become full, resulting in lost packets. In various implementations, when the buffer is close to full (e.g., exceeds a threshold percentage of fullness), the decompression module 226 determines whether to store a received packet or discard the received packet based on the corresponding scaling factor. For example, in various implementations, the decompression module 226 is more likely to discard a packet if the corresponding scaling factor indicates that the resolution of the corresponding portion of the image is low than if the corresponding scaling factor indicates that the resolution of the corresponding portion of the image is high. In various implementations, the decompression module 226 determines whether to store a received packet or discard a received packet based on a continuous function of a buffer fullness (e.g., how full the buffer is) and the corresponding scaling factor. The function may result in the decompression module 226 being more likely to discard a packet as the buffer fullness increases and/or the corresponding scaling factor indicates that the resolution of the corresponding portion of the image is low.

Figure 17:
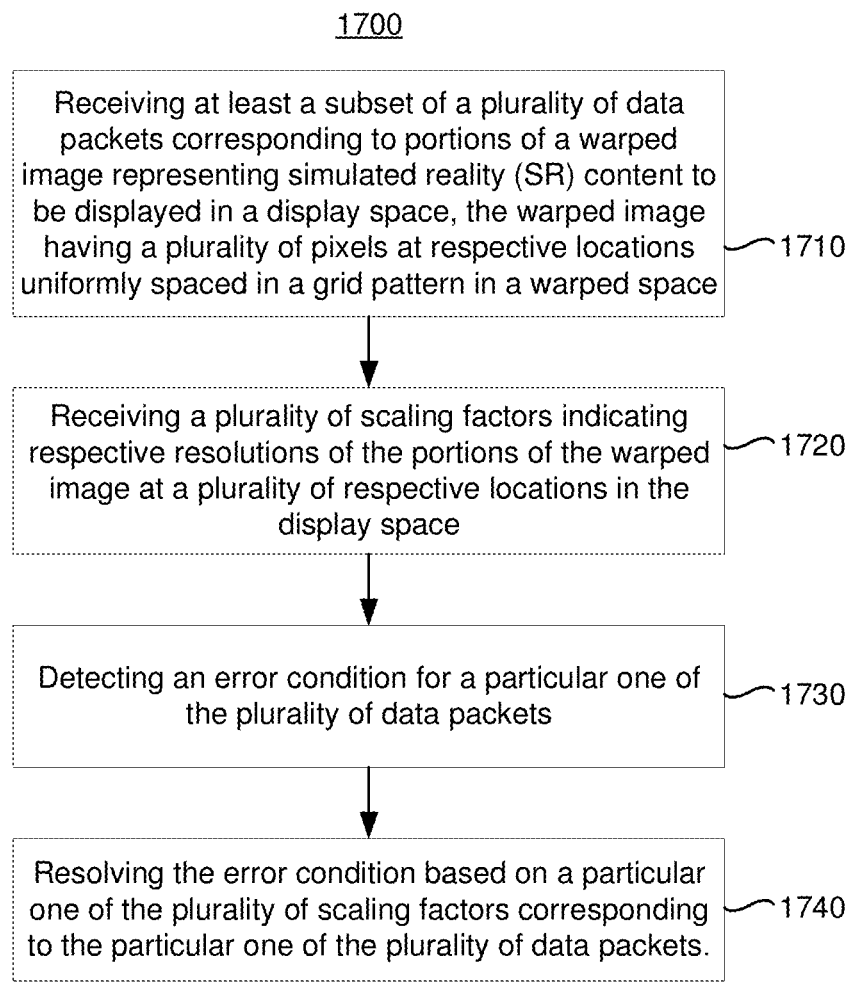
FIG. 17 is a flowchart representation of a method of receiving an image with a constrained rendering resolution function in accordance with some implementations.

FIG. 17 is a flowchart representation of a method 1700 of receiving an image in accordance with some implementations. In some implementations (and as detailed below as an example), the method 1700 is performed by a transport module (or portion thereof), such as the transport module 220 or decompression module 226 of FIG. 2. In various implementations, the method 1700 is performed by an HMD, such as the HMD 100 of FIG. 1, or a portion thereof, such as the SR pipeline 200 of FIG. 2. In various implementations, the method 1700 is performed by a device with one or more processors, non-transitory memory, and one or more SR displays. In some implementations, the method 1700 is performed by processing logic, including hardware, firmware, software, or a combination thereof. In some implementations, the method 1700 is performed by a processor executing instructions (e.g., code) stored in a non-transitory computer-readable medium (e.g., a memory).

The method 1700 begins at block 1710 with the transport module receiving at least a subset of a plurality of data packets corresponding to portions of a warped image representing simulated reality (SR) content to be displayed in a display space, the warped image having a plurality of pixels at respective locations uniformly spaced in a grid pattern in a warped space.

In various implementations, the plurality of respective scaling factors defines a mapping between the warped space and the display space. For example, in various implementations, different parts of the SR content corresponding to non-uniformly spaced regions in the display space are represented by uniformly spaced regions in the warped space.

The method 1700 continues at block 1720 with the transport module receiving a plurality of scaling factors indicating respective resolutions of the portions of the warped image at a plurality of respective locations in the display space.

The method 1700 continues at block 1730 with the transport module detecting an error condition for a particular one of the plurality of data packets. In various implementations, detecting the error condition includes receiving the particular one of the plurality of scaling factors without receiving the particular one of the plurality of data packets. This may indicate that the packet was lost. In various implementations, detecting the error condition includes determining that the particular one of the plurality of data packets is corrupt. For example, in various implementations, a parity bit, cyclic redundancy check, or other indicator indicates that the data packet is corrupt. In various implementations, detecting the error condition includes receiving the particular one of the plurality of data packets while a buffer is full or nearly full. In various implementations, detecting the error condition includes determining that a buffer is storing at least a threshold percentage of data.

The method 1700 continues at block 1740 with the transport module resolving the error condition based on a particular one of the plurality of scaling factors corresponding to the particular one of the plurality of data packets. In various implementations, resolving the error condition includes determining whether to send a retransmission request for the particular one of the plurality of data packets based on the particular one of the plurality of scaling factors. In various implementations, the transport module is more likely to send a retransmission request when the particular one of the plurality of scaling factors indicates that the resolution of the corresponding portion of the warped image is high as compared to when the particular one of the plurality of scaling factors indicates that the resolution of the corresponding portion of the warped image is low. Accordingly, in various implementations, resolving the error condition includes determining to send a retransmission request and sending a retransmission request (or determining not to send a retransmission request).

In various implementations, resolving the error condition includes determining whether to discard or store the particular one of the plurality of data packets based on the particular one of the plurality of scaling factors. In various implementations, the transport module is more likely to store a data packet (in a buffer) when the particular one of the plurality of scaling factors indicates that the resolution of the corresponding portion of the warped image is high as compared to when the particular one of the plurality of scaling factors indicates that the resolution of the corresponding portion of the warped image is low. Accordingly, in various implementations, resolving the error condition includes determining to store the data packet and storing the data packet (or determining to discard the data packet and not storing the data packet).

In various implementations, the method 1700 includes decompressing, decoding, and/or detransforming the warped image.

As described above with respect to FIG. 2, the rendering module 210 provides a rendered image to the transport module 220. As described above, the transport module 220 includes a compression module 222 that compresses the rendered image (resulting in a compressed image), a communications channel 224 that carries the compressed image, and a decompression module 226 that decompresses the compressed image (resulting in a decompressed image) and provides it to the display module 230. Accordingly, subject to distortion caused by compression, transmission, reception, and/or decompression, the display module 230 receives the rendered image provided by the rendering module 210. In various implementations, the transport module 220 is absent and the rendering module 210 provides the rendered image directly to the display module 230.

In various implementations, the display module 230 receives, from the transport module 220 or the rendering module 210, a foveated image having different resolutions at different parts of the image. In various implementations, the display module 230 receives, from the transport module 220 or the rendering module 210, a warped image having a plurality of pixels at respective locations uniformly spaced in a grid pattern in a warped space. The plurality of pixels are respectively associated with a plurality of respective pixel values and a plurality of respective scaling factors indicating a plurality of respective resolutions at a plurality of respective locations in a display space.

In various implementations, the display module 230 receives the scaling factors from the transport module 220 or the rendering module 210. In various implementations, the display module 230 receives a single scaling factor for each pixel. In various implementations, the display module 230 receives a horizontal scaling factor and a vertical scaling for each pixel. In various implementations, the display module 230 receives a single scaling factor for each tile of pixels (e.g., each 32×32 block of pixels). In various implementations, the display module 230 receives a horizontal scaling factor and a vertical scaling factor for each tile of pixels (e.g., each 32×32 block of pixels).

The display module 230 includes a lens compensation module 232 that distorts the decompressed image in an inverse relationship to distortion caused by an eyepiece 242 of the HMD such that the displayed image, when viewed through the eyepiece 242 by a user 250, appears undistorted. The distortion caused by the eyepiece 242 can be described by a homographic distortion function that takes, as an input, a pixel location of a pixel of an input image and provides, as an output, the pixel location of the pixel in the output image.

Accordingly, where F is the homographic distortion function, $(x_1, y_1)$ is the pixel location of a pixel in the input image, and $(x_2, y_2)$ is the pixel location of the pixel in the output image, $$F(x_1,y_1)=(x_2,y_2).$$

Figure 18B:
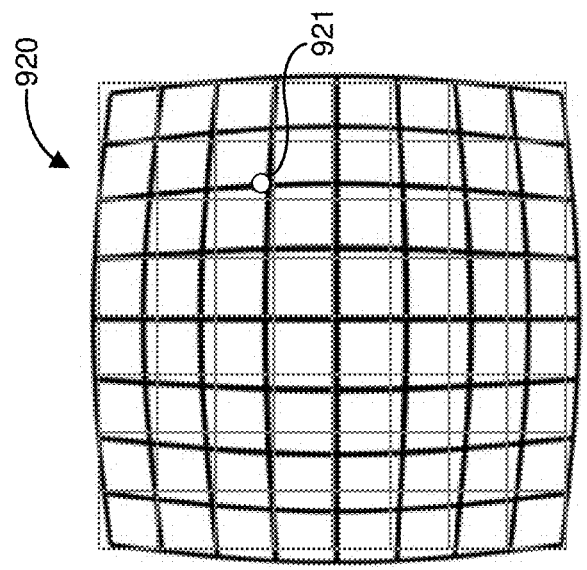
FIGS. 18A-18B illustrate an example undistorted image and distorted image in accordance with some implementations.
Figure 18A:
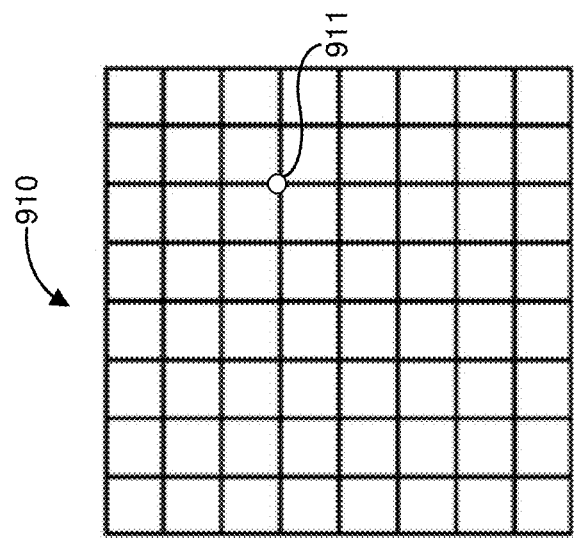

FIG. 18A illustrates an undistorted image 1810 including a pixel 1811 having a first pixel value at a first pixel location. FIG. 18B illustrates a distorted image including a pixel 1821 having the first pixel value at a second pixel location. In FIGS. 18A-18B, the first pixel location is (2, 1) and the second pixel location is (2.2, 1.1).

Thus, a pixel (having a pixel value) at a first pixel location of an input image, when projected through the eyepiece, appears with the same pixel value at a second pixel location of an output image. This relationship, where I(x, y) is the pixel value of the input image at a location (x, y) and O(x, y) is the pixel value of the output image at a location (x, y), can be expressed as:

$$I(x_1,y_1)=O(x_2,y_2).$$

Thus:

$$I(x_1,y_1)=O(F(x_1,y_1)).$$

To address this distortion, the lens compensation module 232 generates a predistorted image such that the output image, distorted by the eyepiece 242, looks like the input image. Thus, wherein P(x, y) is the pixel value of the predistorted image at a location (x, y), $$P(x_1,y_1)=I(x_2,y_2).$$

Thus:

$$P(x_1,y_1)=I(F(x_1,y_1)).$$

When the predistored image is distorted by the eyepiece, $$P(x_1,y_1)=I(x_2,y_2)=O(x_2,y_2).$$

Thus:

$$P(x_1,y_1)=I(x_1,y_1))=O(F(x_1,y_1)).$$

Figure 19B:
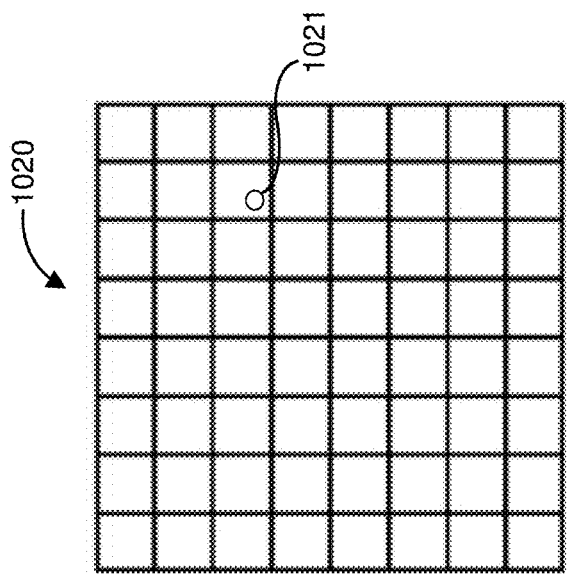
FIGS. 19A-19B illustrate an example predistored image and distorted predistored image (or undistorted image) in accordance with some implementations.
Figure 19A:
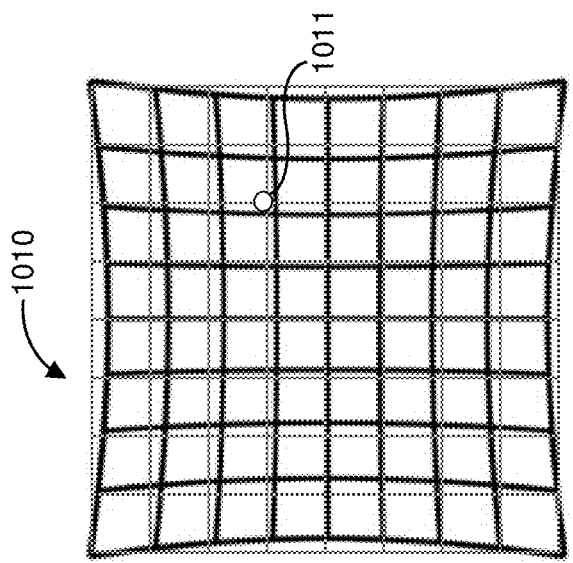

FIG. 19A illustrates a predistored image 1910 including a pixel 1911 having a pixel value at a first pixel location. FIG. 19B illustrates a distorted predistored image (or undistorted image) 1920 including a pixel 1921 having the first pixel value at a second pixel location. In FIGS. 19A-19B, the first pixel location is (2, 1) and the second pixel location is (2.2., 1.1).

In order to determine the pixel value of a pixel of the predistored image at a first location $(x_1, y_1)$, the lens compensation module 232 determines the pixel value of a pixel of the input image at a second location $(x_2, y_2)$. However, in some circumstances, the second location $(x_2, y_2)$ falls between pixel locations of the input image for which pixel values are known.

For example, in FIG. 19A, the pixel value of the pixel 1911 is not the same as the pixel value of the pixel 1811 of FIG. 18A. Rather, the pixel value of the pixel 1911 is the same as the pixel value of a pixel of the undistorted image 1810 at (2.2, 1.1) if such a pixel existed.

Thus, in various implementations, to determine the pixel value of the pixel of the predistored image at the first location, $(x_1, y_1)$, the lens compensation module 232 determines the pixel value of a pixel of the input image at a second location $(x_2, y_2)$ using known pixel values of pixels in a neighborhood around the second location $(x_2, y_2)$, e.g., using interpolation.

A pixel is in a neighborhood of the second location if the pixel is less than a predetermined distance from the second location. In various implementations, this distance is an $L_2$ distance. In various implementations, this distance is an $L_1$ distance. In various implementations, the predetermined distance is one divided by the resolution of the warped image (e.g., the distance between neighboring pixels). In various implementations, the predetermined distance is two divided by the resolution of the warped image.

For example, in FIG. 19A, to determine the pixel value of the pixel 1911, the pixel values of the pixels of the undistorted image 1810 at (2,1), (2,2), (3,1), and (3,2) are used.

In various implementations, the pixel value of a pixel of the predistored image at a first location is a weighted sum of pixel values of pixels of the undistorted image in a neighborhood around the second location. Accordingly, in various implementations, the lens compensation module 232 performs linear interpolation to determine the pixel value of the pixel of the predistored image. In various implementations, the lens compensation module 232 performs various types of interpolation to determine the pixel value of the pixel of the predistored image, such as nearest-neighbor interpolation, polynomial interpolation, or spline interpolation.

Accordingly, where $N(x_2, y_2)$ is a neighborhood of pixels around the second location and $w_i$ are weights, $$P(x_1, y_1) = I(x_2, y_2) = \sum_{i, x_i \in N(x_2, y_2)} w_i I(x_i, y_i)$$

In various implementations, the weights are determined based on the distance (e.g., the $L_2$ distance) between the pixel location and the second location.

Accordingly, in some implementations, where M is a normalization factor, $$P(x_1, y_1) = I(x_2, y_2) = \sum_{i, x_i \in N(x_2, y_2)} \frac{\sqrt[2]{(x_2 - x_i)^2 + (y_2 - y_i)^2}}{M} I(x_i, y_i)$$

In various implementations, the lens compensation module 232 receives a warped image with a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in a display space. Because the display space and the warped space are different and because the output image is distorted by the eyepiece in the display space (not the warped space), the lens compensation module 232 generates the pixel value for a pixel of predistorted image using the scaling factors in addition to the pixel values of neighboring pixels. For a particular pixel, the pixel location in the warped image and the scaling factor generally describes a location in the display space. Different scaling factors of different pixels in a neighborhood indicate different distances than the pixel locations alone would indicate. These different distances can be used in performing interpolation (e.g., determining the weights of interpolation or determining the nearest neighbor).

For example, in various implementations, where $a_x(x,y)$ and $a_y(x,y)$ are the scaling factors associated with a pixel at pixel location (x,y) (or proportional or inversely proportional thereto), the predistorted image is calculated as:

$$P(x_1, y_1) = $$
$$I(x_2, y_2) = \sum_{i, x_i \in N(x_2, y_2)} \frac{\sqrt[2]{a_x^2(x_i, y_i)(x_2 - x_i)^2 + a_y^2(x_i, y_i)(y_2 - y_i)^2}}{M} I(x_i, y_i)$$

FIG. 20 is a flowchart representation of a method 2000 of predistorting an image in accordance with some implementations. In some implementations (and as detailed below as an example), the method 2000 is performed by a display module (or portion thereof), such as the display module 230 or lens compensation module 232 of FIG. 2. In various implementations, the method 2000 is performed by an HMD, such as the HMD 100 of FIG. 1, or a portion thereof, such as the SR pipeline 200 of FIG. 2. In various implementations, the method 2000 is performed by a device with one or more processors, non-transitory memory, and one or more SR displays. In some implementations, the method 2000 is performed by processing logic, including hardware, firmware, software, or a combination thereof. In some implementations, the method 2000 is performed by a processor executing instructions (e.g., code) stored in a non-transitory computer-readable medium (e.g., a memory).

The method 2000 begins at block 2010 with the display module receiving a warped image representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in the display space.

In various implementations, the plurality of respective scaling factors defines a mapping between the warped space and the display space. For example, in various implementations, different parts of the SR content corresponding to non-uniformly spaced regions in the display space are represented by uniformly spaced regions in the warped space.

In various implementations, each of the plurality of pixels is respectively associated with a separately received pixel value. In various implementations, each of the plurality of pixels is respectively associated with a separately received scaling factor (or set of horizontal scaling factor and vertical scaling factor). In various implementations, each of a plurality of tiles of the plurality of pixels is respectively associated with a separately received scaling factor (or set of horizontal scaling factor and vertical scaling factor). Accordingly, a plurality of pixels (e.g., those of a single tile) are associated with a single received scaling factor (or set of horizontal scaling factor and vertical scaling factor).

Thus, in various implementations, the warped image includes a plurality of tiles at respective locations uniformly spaced in a grid pattern in the warped space, wherein each of the plurality of tiles is associated with a respective one or more scaling factors. Also, in various implementations, one or more of the plurality of respective scaling factors include a horizontal scaling factor and a vertical scaling factor.

The method 2000 continues at block 2020 with the display module generating, based on the warped image (particularly, the plurality of respective pixels values thereof), the plurality of respective scaling factors, and a distortion function describing distortion caused by an eyepiece, a lens-compensated warped image that is a version of the warped image distorted in an inverse relationship to the distortion caused by the eyepiece. In various implementations, the lens-compensated warped image, when viewed by a user on a display panel (possibly unwarped after lens-compensation) through the eyepiece, appears undistorted. In various implementations, the display module generates the lens-compensated warped image without generating an intermediate image in a display space. In particular, the display module generates the lens-compensated warped image without unwarping the warped image. Accordingly, and as noted above, the display module generates the lens-compensated warped image based on the plurality of respective scaling factors.

In various implementations, generating the lens-compensated warped image includes determining the pixel value of a plurality of pixels (e.g., each pixel) of the lens-compensated warped image. Accordingly, in various implementations, the display module generates the lens-compensated warped image by determining the pixel value of a particular pixel at a first location of the lens-compensated warped image. In various implementations, the display module determines the pixel of a particular pixel at a first location of the lens-compensated warped image based on the plurality of respective pixel values of pixels of the warped image in a neighborhood of a second location. In various implementations, the neighborhood is a 4×4 block of the pixels closest to the second location. In various implementations, the neighborhood is a 9×9 block of pixels. In various implementations, the display module determines the second location based on the first location and a distortion function of the eyepiece. In various implementations, the distortion function is a homographic distortion function that takes, as an input, a pixel location of a pixel of an input image and provides, as an output, the pixel location of the pixel in the output image.

In various implementations, determining the pixel value of the particular pixel of the lens-compensated warped image includes determining corrected distances between the second location and pixel locations of the plurality of pixels in the neighborhood of the corresponding pixel of the warped image based on the respective scaling factors of the pixels in the neighborhood of the corresponding pixel of the warped image.

For example, in the absence of scaling factors, the distance between a second location at (0, 2) and a first pixel at (0, 1) may be determined to be same as the distance between the second location and a second pixel at (0, 3), e.g., 1.

However, if the first pixel is associated with a scaling factor of 1 and the second pixel is associated with a scaling factor of 4, the corrected distance between the second location and the first pixel (e.g., 1) is less than the corrected distance between the second location and the second pixel (e.g., 4).

In various implementations, determining the pixel value of the particular pixel of the lens-compensated warped image includes choosing one of the plurality of respective pixel values of the warped image in the neighborhood of the second location based on the respective scaling factors of the pixels of the warped image in the neighborhood of the second location. Accordingly, in various implementations, the display module performs nearest-neighbor interpolation, with the nearest neighbor determined based on corrected distances based on the scaling factors.

In various implementations, determining the pixel value of the particular pixel of the lens-compensated warped image includes averaging (e.g., determining a weighted average of) the plurality of respective pixel values of pixels of the warped image in the neighborhood of the second location based on the respective scaling factors of the pixels of the warped image in the neighborhood of the second location. Accordingly, in various implementations, the display module performs polynomial interpolation (of which linear interpolation is an example), with weights determined based on corrected distances based on the scaling factors. Thus, in various implementations, the pixel value of the particular pixel of the lens-compensated warped image is a weighted average of pixels value of pixels, weighted by the corrected distance between the second location and the pixels.

As described above with respect to FIG. 2, the lens compensation module 232 provides the lens-compensated warped image (and the respective scaling factors) to the panel compensation module 234. The panel compensation module 234 converts the lens-compensated warped image into panel data to be read by the display panel 240. Accordingly, in various implementations, the panel compensation module 234 receives a warped image (e.g., the lens-compensated warped image) with a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in a display space.

The display panel 240 includes a matrix of M×N pixels located at respective locations in a display space. The display panel 240 displays a displayed image by emitting light from each of the pixels as described by the panel data. In various implementations, the panel data includes a pixel value for each pixel of the display panel 240. For example, the panel data can include a pixel value for a particular pixel of the display panel 240 and the particular pixel emits light according that pixel value. In various implementations, the panel data includes a pixel value for each of a plurality of blocks of pixels of the display panel 240. For example, the panel data can include a pixel value for a 2×2 block of pixels of the display panel 240 and each of the pixels of the block emits light according that pixel value.

In various implementations, the panel data includes data regarding a plurality of resolution zones. Each resolution zone is defined by a boundary and one or more resolution-reduction factors that are whole numbers (e.g., a single resolution-reduction factor or both a horizontal resolution-reduction factor and a vertical resolution reduction factor).

Figure 21B:
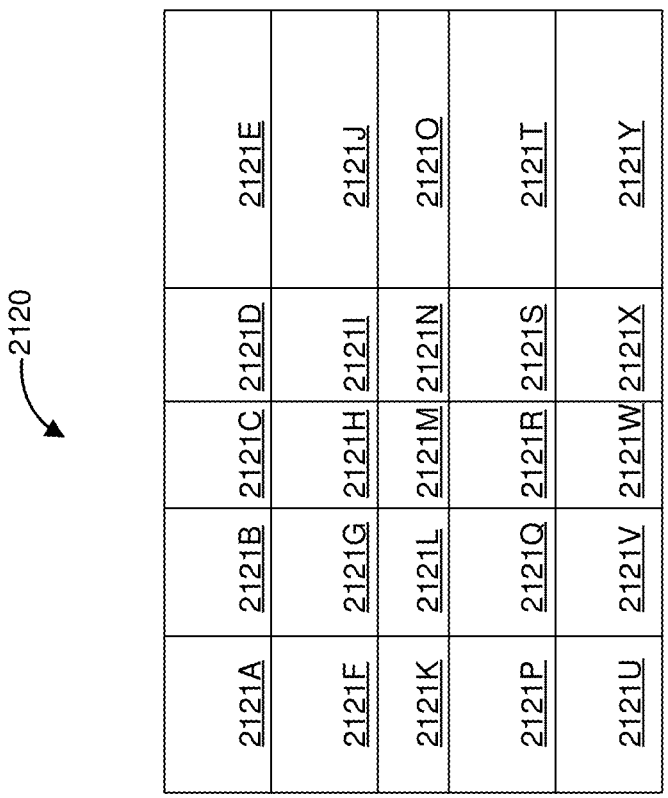
FIGS. 21A-21B illustrate representations of panel data indicating a plurality of resolution zones in accordance with some implementations.
Figure 21A:
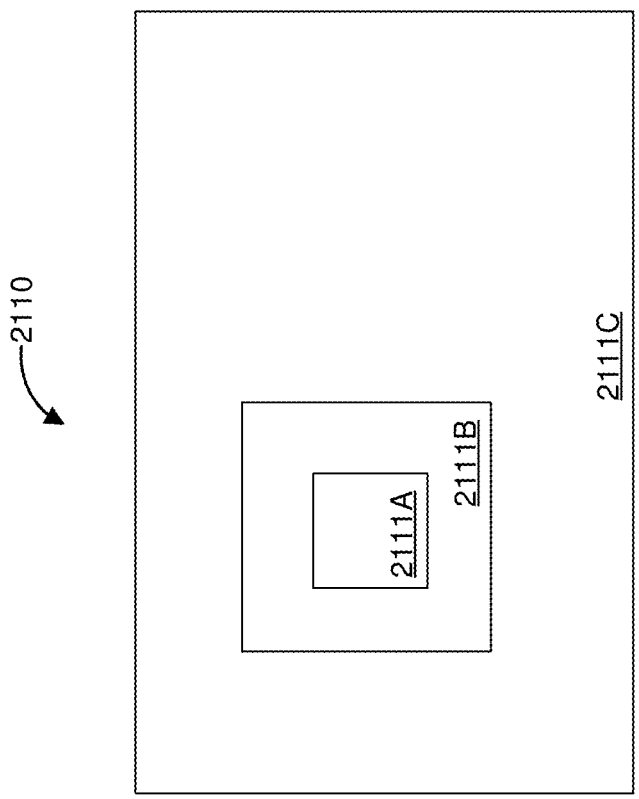

FIG. 21A illustrates a representation of panel data 2110 indicating a plurality of resolution zones 2111A-2111C. The plurality of resolution zones 2111A-2111C includes a first resolution zone 2111A with a first boundary and a resolution-reduction factor of one. With a resolution-reduction factor of one, the resolution is not reduced from the maximum resolution of the display panel 240 and each pixel value received is displayed by a single pixel of the display panel 240. The plurality of resolution zones 2111A-2111C includes a second resolution zone 2111B with a second boundary and a resolution-reduction factor of two. The second boundary of the second resolution zone 2111B includes two parts, an inner part at the same location as the first boundary of the first resolution zone 2111A and an outer part surrounding the second resolution zone 2111B. With a resolution-reduction factor of two, the resolution is reduced to half the maximum resolution of the display panel 240 and each pixel value received by the display panel 240 is displayed by a 2×2 block of pixels of the display panel 240. The plurality of resolution zones 2111A-2111C includes a third resolution zone 2111C with a third boundary and a resolution-reduction factor of four. The third boundary of the third resolution zone 2111C includes two parts, an inner part at the same location as the outer part of the second boundary of the second resolution zone 2111B and an outer part at the edge of the display panel 240. With a resolution-reduction factor of four, the resolution is reduced to a quarter of the maximum resolution of the display panel 240 and each pixel value received by the display panel 240 is displayed by a 4×4 block of pixels of the display panel 240.

In various implementations, the panel data indicating the plurality of resolution zones takes various forms. For example, in various implementations, the plurality of resolution zones 2111A-2111C are communicated as a location of the first resolution zone 2111A (e.g., the location of the top-left pixel), a size of the first resolution zone 2111A, a location of the second resolution zone 2111B (e.g., the location of the top-left pixel), and the size of the second resolution zone 2111B if it included the first resolution zone 2111A. The boundary of the third resolution zone 2111C can be determined inferentially as taking up the remainder of the display panel 240. Similarly, the resolution-reduction factors can be determined inferentially as one, two, and four.

FIG. 21B illustrates a representation of panel data 2120 indicating a plurality of resolution zones 2121A-2121Y. The plurality of resolution zones 2121A-2121Y includes a first resolution zone 2121M with a first boundary, a horizontal resolution-reduction factor of one and a vertical resolution-reduction factor of one. With both the horizontal resolution-reduction factor and the vertical resolution-reduction factor of one, the resolution is not reduced from the maximum resolution of the display panel 240 and each pixel value received is displayed by a single pixel of the display panel 240. Accordingly, in various implementations, the plurality of resolution zones includes a resolution zone in which the resolution is not reduced.

The plurality of resolution zones 2121A-2121Y includes a second resolution zone 2121N with a second boundary, a horizontal resolution-reduction factor of two, and a vertical resolution-reduction factor of one. With a horizontal resolution-reduction factor of two and a vertical resolution-reduction factor of one, the horizontal resolution is half the maximum horizontal resolution of the display panel 240, the vertical resolution is not reduced from the maximum vertical resolution of the display panel 240, and each pixel value received is displayed by a 2×1 block of pixels of the display panel 240. Accordingly, in various implementations, the plurality of resolution zones includes a resolution zone in which the resolution is reduced in one dimension, but not reduced in another dimension.

The plurality of resolution zones 2121A-2121Y includes a third resolution zone 1221S with a third boundary, a horizontal resolution-reduction factor of two, and a vertical resolution-reduction factor of two. With both the horizontal resolution-reduction factor and the vertical resolution-reduction factor of two, the resolution is half the maximum resolution of the display panel 240 and each pixel value received is displayed by a 2×2 block of pixels of the display panel 240. Accordingly, in various implementations, the plurality of resolution zones includes a resolution zone in which the resolution is reduced in both dimensions.

The plurality of resolution zones 2121A-2121Y includes a fourth resolution zone 1221T with a horizontal resolution-reduction factor of four and a vertical resolution reduction factor of two. With a horizontal resolution-reduction factor of four and a vertical resolution-reduction factor of two, the horizontal resolution is a quarter of the maximum horizontal resolution of the display panel 240, the vertical resolution is half of maximum vertical resolution of the display panel 240, and each pixel value received is displayed by a 4×2 block of pixels of the display panel 240. Accordingly, in various implementations, the plurality of resolution zones includes a resolution zone in which the resolution is reduced a first amount in one dimension and reduced a second amount (different than the first amount) in another dimension.

As noted above, in various implementations, the panel data indicating the plurality of resolution zones takes various forms. For example, in various implementations, the plurality of resolution zones 2121A-2121Y are communicated as a location of the each resolution zone, a size of each resolution zone, and the corresponding horizontal and vertical resolution-reduction factors. In various implementations, the locations of the resolution zones can be inferred from the size (e.g., the first resolution zone is located at the top-left, the second resolution zone is located adjacent to and to the right of the first resolution zone, the third resolution zone is located adjacent to and to the right of the second resolution zone, the fourth resolution zone is located adjacent to and to the right of the third resolution zone, the fifth resolution zone is located adjacent to and to the right of the fourth resolution zone, the six resolution zone is located adjacent to and beneath the first resolution zone, etc.).

Referring again to FIG. 2, the panel compensation module 234 generates the panel data based on the warped image and the scaling factors. As described above, in various implementations, the scaling factors are generated (by the rendering module 210) based on a rendering resolution function. Accordingly, the scaling factors define a resolution function that generally describes the resolution of the displayed image as a function of location in the display space. Similarly, the resolution zones (e.g., their location, size, and reduction-resolution factors) define a resolution function describing the resolution of the displayed image as a function of location in the display space.

FIG. 22 illustrates a graph 2200 of example resolution functions defined by scaling factors and resolution zones. The graph 2200 includes a first resolution function 2210 defined by scaling factors associated with a warped image. The graph 2200 includes a second resolution function 2220 defined by a plurality of resolution zones having corresponding resolution-reduction factors.

Figure 23:
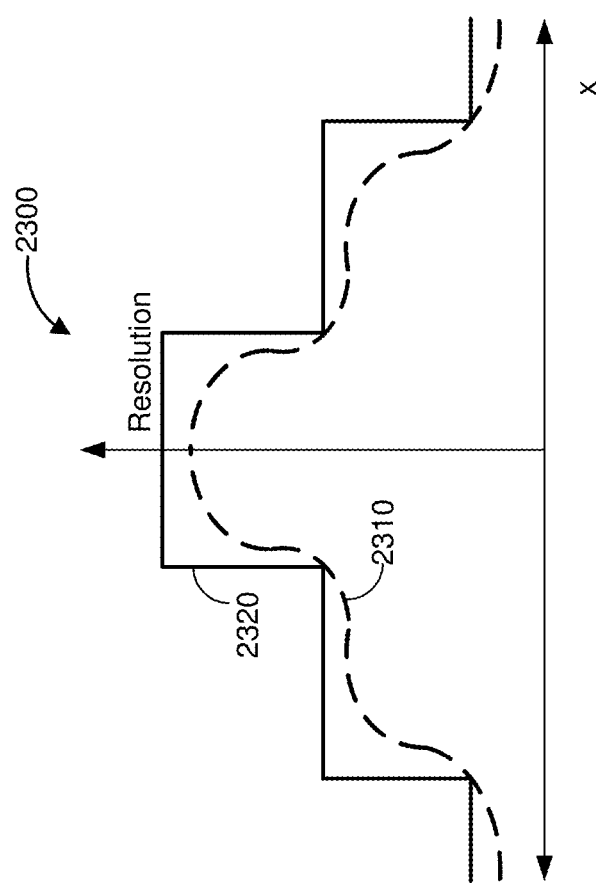
FIG. 23 illustrates another graph of example resolution functions defined by scaling factors and resolution zones in accordance with some implementations.

FIG. 23 illustrates another graph 2300 of example resolution functions defined by scaling factors and resolution zones. The graph 2300 includes a first resolution function 2310 defined by scaling factors associated with a warped image. The graph 2300 includes a second resolution function 2320 defined by a plurality of resolution zones having corresponding resolution-reduction factors.

In various implementations, the panel compensation module 234 determines the boundaries of the resolution zones and the corresponding resolution-reduction factors of the resolution zones based on the scaling factors such that the resolution function defined by the resolution zones is, at all locations, greater than the resolution function defined by the scaling factors. In this way, artifacts at the edges of the resolution zones due to a change in resolution are minimized.

In various implementations, the panel compensation module 234 determines the boundary (e.g., size and location) of a full-resolution resolution zone having a resolution-reduction factor of one (or a horizontal resolution-reduction factor and a vertical resolution-reduction factor both equal to one). In various implementations, the center of the full-resolution resolution zone is located at the center of the maximum of the resolution function indicated by the scaling factors (e.g., where the user is looking).

In various implementations, the size of the full-resolution resolution zone is determined based on various factors. For example, in various implementations, the size of the full-resolution resolution zone is determined based on the peak width of the resolution function indicated by the scaling factors. In various implementations, the size of the full-resolution resolution zone is determined based on eye tracking data, e.g., how much the gaze of the user is moving. In various implementations, the size of the full-resolution resolution zone is determined based on eye tracking metadata indicative of a characteristic of the eye tracking data.

In various implementations, the eye tracking metadata includes data indicative of a confidence of the eye tracking data. For example, in various implementations, the eye tracking metadata provides a measurement of a belief that the eye tracking data correctly indicates the gaze of the user. In various implementations, the data indicative of the confidence of the eye tracking data includes data indicative of an accuracy of the eye tracking data. In various implementations, the data indicative of the confidence of the eye tracking data includes data indicative of a latency of the eye tracking data (e.g., a different between the time the eye tracking data is generated and the time the eye tracking data is received). In various implementations, the eye tracking data includes data indicative of a prediction of the gaze of the user, and the data indicative of a confidence of the eye tracking data includes data indicative of a confidence of the prediction. In various implementations, the data indicative of a prediction of the gaze of the user is based on past measurements of the gaze of the user with respect to past captured images. In various implementations, the prediction of the gaze of the user is based on categorized past motion of the gaze of the user as a continuous fixation, smooth pursuit, saccade, etc. In various implementations, the confidence of the prediction is based on this categorization. In particular, in various implementations, the confidence of the prediction is higher when past motion is categorized as a continuous fixation or smooth pursuit than when the past motion is categorized as a saccade. Accordingly, in various implementations, the size of the full-resolution resolution zone is determined based on data indicative of a confidence of the eye tracking data. For example, in various implementations, the size of the full-resolution resolution zone is greater when the confidence is less.

In various implementations, the eye tracking metadata includes data indicative of one or more biometrics of the user, and, in particular, biometrics which affect the eye tracking metadata or its confidence. In particular, in various implementations, the biometrics of the user include one or more of eye anatomy, ethnicity/physionomegy, eye color, age, visual aides (e.g., corrective lenses), make-up (e.g., mascara), medical condition, historic gaze variation, input preferences or calibration, headset position/orientation, pupil dilation/center-shift, and/or eyelid position. Accordingly, in various implementations, the size of the full-resolution resolution zone is determined based on one or more biometrics of the user.

In various implementations, the eye tracking metadata includes data indicative of one or more conditions of an environment of the user in which the eye tracking data was generated. In particular, in various implementations, the environmental conditions include one or more of vibration, ambient temperature, IR direction light, or IR light intensity. Accordingly, in various implementations, the size of the full-resolution resolution zone is determined based one or more conditions of an environment of the user.

In various implementations, with the size of the full-resolution resolution zone determined (e.g., the width of the top of the resolution function 2220 of FIG. 22), the boundaries of the remaining resolution zones are determined such that the resolution function indicated by the resolution zones is minimized while still being greater than the resolution function indicated by the scaling factors. In various implementations, the minimization is limited by the fact that the resolution-reduction factors are whole numbers (or a subset thereof, such as only one, two, or four). In various implementations, the minimization is limited by the fact that the size of the resolution zones must be a multiple of the reduction-resolution factors (e.g., a resolution zone with a resolution-reduction factor of two must be 2U×2 V where U and V are whole numbers). In various implementations, the minimization is limited by the fact that the total size of the resolution zones must be equal to the size of the display panel.

In various implementations, the size of the other resolution zones are based on the shape of the resolution function indicated by the scaling factors. For example, in FIG. 23, the resolution function 2310 indicated by the scaling factors decreases as a function of distance from a focal window according to a curved step function with steps at a set of distances and the resolution function 2320 indicated by the resolution zones decreases as a function of distance from the focal window according to a step function with steps at the set of distances.

Figure 24:
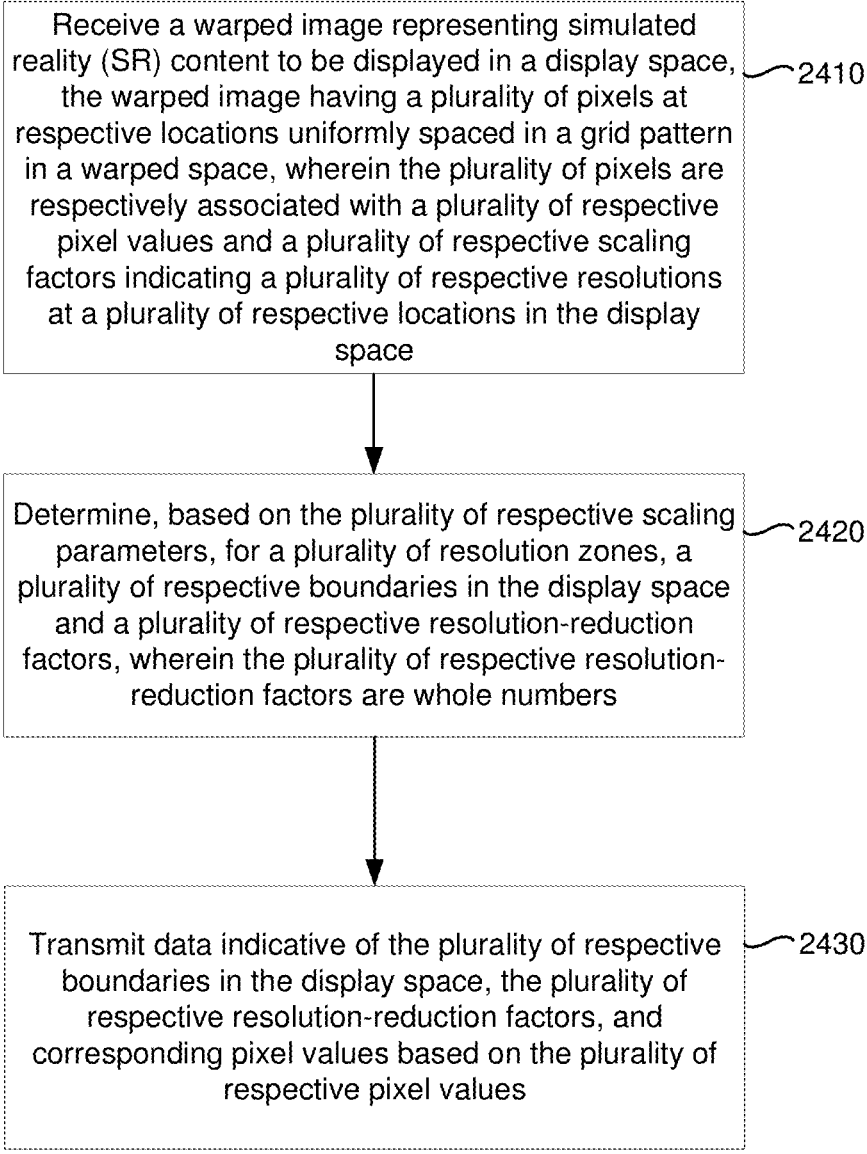
FIG. 24 is a flowchart representation of a method of generating panel data in accordance with some implementations.

FIG. 24 is a flowchart representation of a method 2400 of generating panel data in accordance with some implementations. In some implementations (and as detailed below as an example), the method 2400 is performed by a display module (or portion thereof), such as the display module 230 or panel compensation module 234 of FIG. 2. In various implementations, the method 2400 is performed by an HMD, such as the HMD 100 of FIG. 1, or a portion thereof, such as the SR pipeline 200 of FIG. 2. In various implementations, the method 2400 is performed by a device with one or more processors, non-transitory memory, and one or more SR displays. In some implementations, the method 2400 is performed by processing logic, including hardware, firmware, software, or a combination thereof. In some implementations, the method 2400 is performed by a processor executing instructions (e.g., code) stored in a non-transitory computer-readable medium (e.g., a memory).

The method 2400 begins at block 2410 with the display module receiving a warped image (e.g., a lens-compensated warped image) representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in the display space.

In various implementations, the plurality of respective scaling factors defines a mapping between the warped space and the display space. For example, in various implementations, different parts of the SR content corresponding to non-uniformly spaced regions in the display space are represented by uniformly spaced regions in the warped space.

In various implementations, each of the plurality of pixels is respectively associated with a separately received pixel value. In various implementations, each of the plurality of pixels is respectively associated with a separately received scaling factor (or a set scaling factors including a horizontal scaling factor and a vertical scaling factor). In various implementations, each of a plurality of tiles of the plurality of pixels is respectively associated with a separately received scaling factor (or a set of scaling factors including a horizontal scaling factor and a vertical scaling factor). Accordingly, a plurality of pixels (e.g., those of a single tile) are associated with a single received scaling factor (or set of scaling factors including a single horizontal scaling factor and a single vertical scaling factor).

Thus, in various implementations, the warped image includes a plurality of tiles at respective locations uniformly spaced in a grid pattern in the warped space, wherein each of the plurality of tiles is associated with a respective one or more scaling factors. Also, in various implementations, one or more of the plurality of respective scaling factors include a horizontal scaling factor and a vertical scaling factor.

In various implementations, at least one of the plurality of scaling factors is not a whole number. For example, in generating the scaling factors as the difference between two tangent functions, most of the plurality of scaling factors would not be whole numbers.

The method 2400 continues at block 2420 with the display module determining, based on the plurality of respective scaling parameters, for a plurality of resolution zones, a plurality of respective boundaries in the display space and a plurality of respective resolution-reduction factors, wherein the plurality of respective resolution-reduction factors are whole numbers. In various implementations, the plurality of respective resolution-reduction factors includes, for a particular resolution zone, a single resolution-reduction factor. In various implementations, the plurality of respective resolution-reduction factors includes, for a particular resolution zone, a horizontal resolution-reduction factor and a vertical resolution-reduction factor. In various implementations, the plurality of respective resolution-reduction factors includes a first resolution-reduction factor of one, a second resolution-reduction factor of two, and a third resolution-reduction factor of four.

The plurality of resolution-reduction factors indicate a resolution at each of the plurality of respective locations in the display space (generally describing a resolution function). Similarly, the plurality of respective scaling factors indicate a resolution at each of the plurality of respective locations in the display space (generally describing a resolution function). In various implementations, the plurality of respective resolution-reduction factors indicate a resolution at each of the plurality of respective locations in the display space greater than the respective resolutions at the plurality of respective locations in the display space indicated by the plurality of respective scaling factors.

For example, in various implementations, the respective resolutions at the plurality of respective locations in the display space indicated by the plurality of respective scaling factors decrease as a function of distance from a focal window according to a strictly decreasing function (e.g., as shown by the resolution function 2210 of FIG. 22) and the resolution at each of the plurality of respective locations in the display space indicated by the respective resolution-reduction factors decrease as a function of distance from the focal window according to a step function (e.g., as shown by the resolution function 2220 of FIG. 22).

As another example, in various implementations, the respective resolutions at the plurality of respective locations in the display space indicated by the plurality of respective scaling factors decrease as a function of distance from a focal window according to a curved step function with steps at a set of distances (e.g., as shown by the resolution function 2310 of FIG. 23) and the resolution at each of the plurality of respective locations in the display space indicated by the respective resolution-reduction factors decrease as a function of distance from the focal window according to a step function with steps at the set of distances (e.g., as shown by the resolution function 2320 of FIG. 23).

In various implementations, a size of one or more of the plurality of resolution zones, in particular a full-resolution resolution zone, is based on eye tracking data. In various implementations, a size of one or more of the plurality of resolution zones, in particular a full-resolution resolution zone, is based on eye tracking metadata, such as a confidence in the eye tracking data.

The method 2400 continues at block 2430 with the display module transmitting data indicative of the plurality of respective boundaries in the display space, the plurality of respective resolution-reduction factors, and corresponding pixel values based on the plurality of respective pixel values. In various implementations, the transmitted data is panel data. In various implementations, the transmitted data is transmitted to a display panel.

Figure 25:
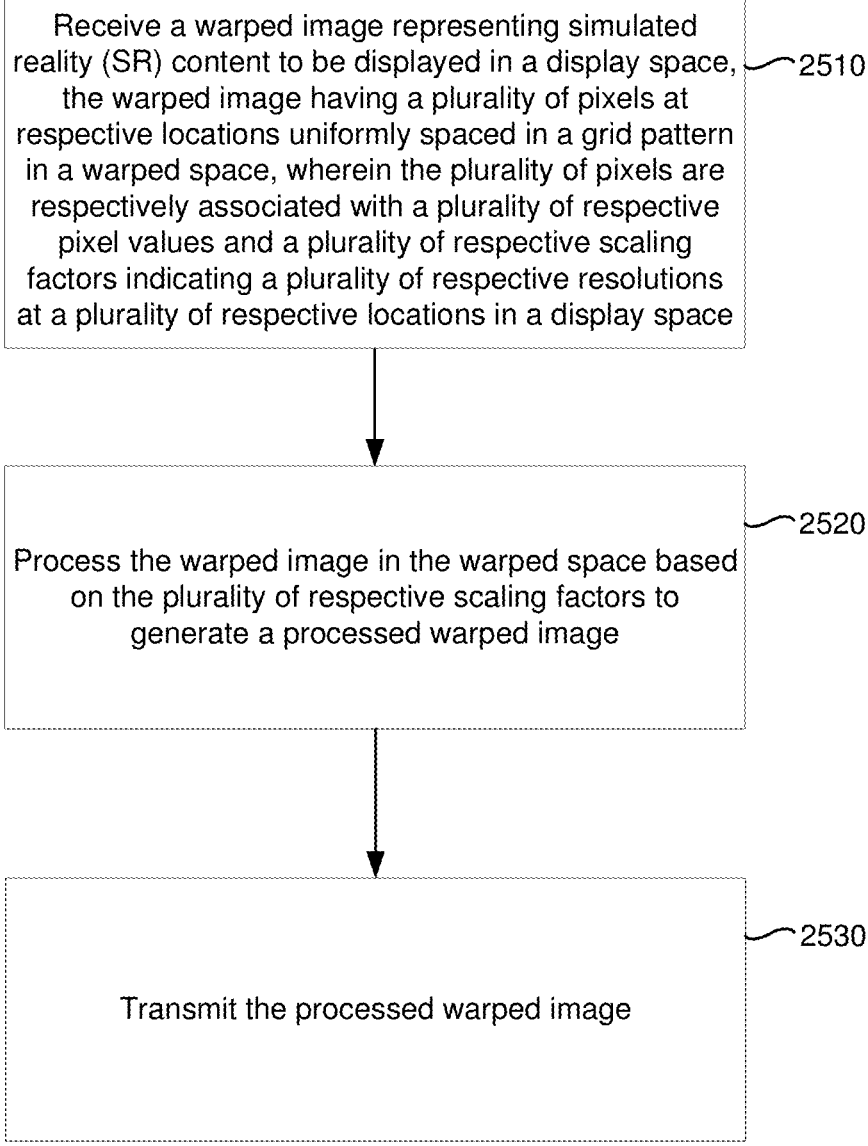
FIG. 25 is a flowchart representation of a method of processing a warped image in a warped space in accordance with some implementations.

FIG. 25 is a flowchart representation of a method 2500 of processing a warped image in a warped space in accordance with some implementations. In some implementations (and as detailed below as an example), the method 2500 is performed by a module (or portion thereof), such as the transport module 220 or display module 230 of FIG. 2. In various implementations, the method 2500 is performed by an HMD, such as the HMD 100 of FIG. 1, or a portion thereof, such as the SR pipeline 200 of FIG. 2 (or a portion thereof). In various implementations, the method 2500 is performed by a device with one or more processors, non-transitory memory, and one or more SR displays. In some implementations, the method 2500 is performed by processing logic, including hardware, firmware, software, or a combination thereof. In some implementations, the method 2500 is performed by a processor executing instructions (e.g., code) stored in a non-transitory computer-readable medium (e.g., a memory).

The method 2500 begins at block 2510 with the module receiving a warped image representing simulated reality (SR) content to be displayed in a display space, the warped image having a plurality of pixels at respective locations uniformly spaced in a grid pattern in a warped space, wherein the plurality of pixels are respectively associated with a plurality of respective pixel values and a plurality of respective scaling factors indicating a plurality of respective resolutions at a plurality of respective locations in the display space.

In various implementations, the plurality of respective scaling factors defines a mapping between the warped space and the display space. For example, in various implementations, non-uniformly spaced regions of the SR content corresponding to different amounts of area in the display space are represented by the same amount of area in the warped image.

In various implementations, each of the plurality of pixels is respectively associated with a separately received pixel value. In various implementations, each of the plurality of pixels is respectively associated with a separately received scaling factor (or a set scaling factors including a horizontal scaling factor and a vertical scaling factor). In various implementations, each of a plurality of tiles of the plurality of pixels is respectively associated with a separately received scaling factor (or a set of scaling factors including a horizontal scaling factor and a vertical scaling factor). Accordingly, a plurality of pixels (e.g., those of a single tile) are associated with a single received scaling factor (or set of scaling factors including a single horizontal scaling factor and a single vertical scaling factor).

Thus, in various implementations, the warped image includes a plurality of tiles at respective locations uniformly spaced in a grid pattern in the warped space, wherein each of the plurality of tiles is associated with a respective one or more scaling factors. Also, in various implementations, one or more of the plurality of respective scaling factors include a horizontal scaling factor and a vertical scaling factor.

The method 2500 continues at block 2520 with the module processing the warped image in the warped space based on the plurality of respective scaling factors to generate a processed warped image. In various implementations, the processed warped image, like the warped image, includes a plurality of pixels at respective locations uniformly spaced in a grid pattern in a warped space. In various implementations, the plurality of pixels are respectively associated with a plurality of respective pixel values (which may be different than the plurality of respective pixel values of the warped image) and the plurality of respective scaling factors indicating a plurality of respective resolutions at a plurality of respective locations in a display space.

In various implementations, processing the warped image in the warped space excludes processing the warped image in the warped space. Accordingly, processing the warped image in the warped space excludes converting the warped image into a display-space image including a plurality of pixels at respective locations uniformly spaced in a grid pattern in the display space, excludes processing such a display-space image, and excludes converting a processed display-space image into the processed warped image in the warped space. Avoiding these steps (e.g., converting, processing, and backconverting) saves substantial processing time and power. Accordingly, in a mobile device such as an HMD, battery power is saved by processing the warped image in the warped space rather than in the display space.

In various implementations, the warped image is entirely processed, from the rendering module which produces the warped image to the display panel which displays an image based on the processed warped image, in the warped space. Accordingly, in various implementations, receiving the warped image (in block 2510) includes receiving the warped image from a rendering module. In some implementations, transmitting the processed warped image (as described below in block 2530) includes transmitting the processed warped image to a display panel. In various implementations, processing the warped image in the warped space includes processing the warped image in the warped space according to a plurality of processes in the warped space (e.g., two or more of compression, error-correcting coding, distortion [such as lens compensation], filtering, etc. are performed in the warped space).

In various implementations, processing the warped image in the warped space includes compressing the warped image based on the plurality of respective scaling factors. Examples are described above with respect to FIG. 15. In various implementations, processing the warped image in the warped space includes error-correcting coding the warped image based on the plurality of respective scaling factors. Examples are described above with respect to FIG. 15.

In various implementations, processing the warped image in the warped space includes distorting the warped image based on the plurality of respective scaling factors. Examples are described above with respect to FIG. 20.

In various implementations, processing the warped image in the warped space includes filtering the warped image based on the plurality of respective scaling factors. For example, applying a simple low-pass filter defined by a normalized 3×3 matrix of ones would improperly weight pixels having a scaling factor indicating a low resolution (where a pixel represents a larger area in the display space) as compared to pixels having a scaling factor indicating a high resolution (where a pixel represents a smaller area in the display space). Accordingly, in various implementations, filtering the warped image in the warped space based on the plurality of scaling factors includes determining, for a particular pixel value, a filtered pixel value as a weighted sum of neighboring pixel values of neighboring pixels, wherein the weights are based on a filter kernel (e.g., a normalized matrix of ones, a Guassian blur filter kernel) and the respective scaling factors of the neighboring pixels.

In various implementations, processing the warped image in the warped space includes color correcting the warped image based on the plurality of respective scaling factors.

Thus, in various implementations, processing the warped image in the warped space (e.g., distorting, filtering, or color correcting the warped image) includes determining, for a particular pixel of the warped image, a pixel value of a corresponding pixel (e.g., at the same location in the warped space) of the processed warped image based on the respective pixel values of pixels of the warped image in a neighborhood of the particular pixel and the respective scaling factors of the pixels of the warped image in the neighborhood of the particular pixel.

The method 2500 continues at block 2530 with the module transmitting the processed warped image. In various implementations, the module transmits the processed warped image along with the respective plurality of scaling factors.

Figure 26:
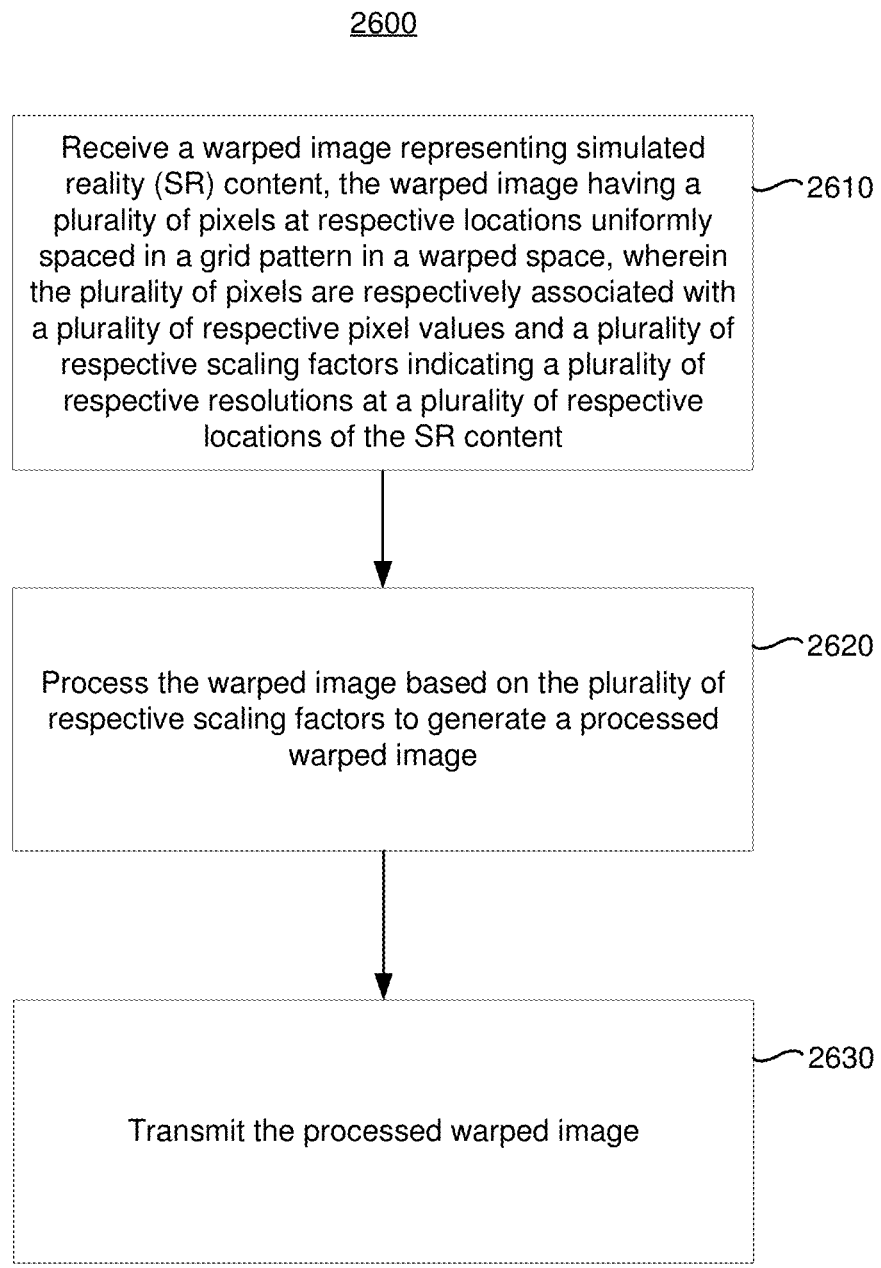
FIG. 26 is a flowchart representation of a method of processing a warped image based on a plurality of scaling factors in accordance with some implementations.

FIG. 26 is a flowchart representation of a method 2600 of processing a warped image based on a plurality of scaling factors in accordance with some implementations. In some implementations (and as detailed below as an example), the method 2600 is performed by a module (or portion thereof), such as the transport module 220 or display module 230 of FIG. 2. In various implementations, the method 2600 is performed by an HMD, such as the HMD 100 of FIG. 1, or a portion thereof, such as the SR pipeline 200 of FIG. 2 (or a portion thereof). In various implementations, the method 2600 is performed by a device with one or more processors, non-transitory memory, and one or more SR displays. In some implementations, the method 2600 is performed by processing logic, including hardware, firmware, software, or a combination thereof. In some implementations, the method 2600 is performed by a processor executing instructions (e.g., code) stored in a non-transitory computer-readable medium (e.g., a memory).

The method 2600 begins at block 2610 with the module receiving a warped image representing simulated reality (SR) content, the warped image having a plurality of pixels at respective locations uniformly spaced in a grid pattern, wherein the plurality of pixels are respectively associated with a plurality of respective pixel values and a plurality of respective scaling factors indicating a plurality of respective resolutions at a plurality of respective locations of the SR content. In various implementations, different parts of the SR content corresponding to non-uniformly spaced regions of the SR content are represented by the same amount of area in the warped image.

In various implementations, each of the plurality of pixels is respectively associated with a separately received pixel value. In various implementations, each of the plurality of pixels is respectively associated with a separately received scaling factor (or a set scaling factors including a horizontal scaling factor and a vertical scaling factor). In various implementations, each of a plurality of tiles of the plurality of pixels is respectively associated with a separately received scaling factor (or a set of scaling factors including a horizontal scaling factor and a vertical scaling factor). Accordingly, a plurality of pixels (e.g., those of a single tile) are associated with a single received scaling factor (or set of scaling factors including a single horizontal scaling factor and a single vertical scaling factor).

Thus, in various implementations, the warped image includes a plurality of tiles at respective locations uniformly spaced in a grid pattern, wherein each of the plurality of tiles is associated with a respective one or more scaling factors. Also, in various implementations, one or more of the plurality of respective scaling factors include a horizontal scaling factor and a vertical scaling factor.

The method 2600 continues at block 2620 with the module processing the warped image based on the plurality of respective scaling factors to generate a processed warped image. In various implementations, the processed warped image, like the warped image, includes a plurality of pixels at respective locations uniformly spaced in a grid pattern. In various implementations, the plurality of pixels are respectively associated with a plurality of respective pixel values (which may be different than the plurality of respective pixel values of the warped image) and the plurality of respective scaling factors indicating a plurality of respective resolutions at a plurality of respective locations of the SR content.

In various implementations, processing the warped image based on the respective plurality of scaling factors excludes generating an unwarped image in which different parts of the SR content correspond to uniformly spaced regions of the SR content are represented by uniformly spaced regions of the unwarped image.

In various implementations, the warped image is entirely processed, from the rendering module which produces the warped image to the display panel which displays an image based on the processed warped image, based on the plurality of respective scaling factors. Accordingly, in various implementations, receiving the warped image (in block 2510) includes receiving the warped image from a rendering module. In some implementations, transmitting the processed warped image (as described below in block 2630)

includes transmitting the processed warped image to a display panel. In various implementations, processing the warped image based on the plurality of respective scaling factors includes processing the warped image based on the plurality of respective scaling factors according to a plurality of processes (e.g., two or more of compression, error-correcting coding, distortion [such as lens compensation], filtering, etc. are performed based on the plurality of respective scaling factors).

In various implementations, processing the warped image based on the plurality of respective scaling factors includes compressing the warped image based on the plurality of respective scaling factors. Examples are described above with respect to FIG. 15. In various implementations, processing the warped image based on the plurality of respective scaling factors includes error-correcting coding the warped image based on the plurality of respective scaling factors. Examples are described above with respect to FIG. 15.

In various implementations, processing the warped image based on the plurality of respective scaling factors includes distorting the warped image based on the plurality of respective scaling factors. Examples are described above with respect to FIG. 20.

In various implementations, processing the warped image based on the plurality of respective scaling factors includes filtering the warped image based on the plurality of respective scaling factors. For example, applying a simple low-pass filter defined by a normalized 3×3 matrix of ones would improperly weight pixels having a scaling factor indicating a low resolution (where a pixel represents a larger area in the display space) as compared to pixels having a scaling factor indicating a high resolution (where a pixel represents a smaller area in the display space). Accordingly, in various implementations, filtering the warped image based on the plurality of scaling factors includes determining, for a particular pixel value, a filtered pixel value as a weighted sum of neighboring pixel values of neighboring pixels, wherein the weights are based on a filter kernel (e.g., a normalized matrix of ones, a Guassian blur filter kernel) and the respective scaling factors of the neighboring pixels.

In various implementations, processing the warped image based on the plurality of respective scaling factors includes color correcting the warped image based on the plurality of respective scaling factors.

Thus, in various implementations, processing the warped image based on the plurality of respective scaling factors (e.g., distorting, filtering, or color correcting the warped image) includes determining, for a particular pixel of the warped image, a pixel value of a corresponding pixel of the processed warped image based on the respective pixel values of pixels of the warped image in a neighborhood of the particular pixel and the respective scaling factors of the pixels of the warped image in the neighborhood of the particular pixel.

The method 2600 continues at block 2630 with the module transmitting the processed warped image. In various implementations, the module transmits the processed warped image along with the respective plurality of scaling factors.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   receiving a warped image with a plurality of pixels at respective locations uniformly spaced in a grid pattern in a warped space, wherein the plurality of pixels is respectively associated with a plurality of respective pixel values and a plurality of respective scaling factors indicating a plurality of respective resolutions at a plurality of respective locations in a display space; and
   generating, based on the plurality of respectively pixels values of the warped image and the plurality of respective scaling factors, a lens-compensated warped image that is a version of the warped image distorted in an inverse relationship to distortion caused by an eyepiece.

2. The method of claim 1, wherein the warped image includes a plurality of tiles at respective locations uniformly spaced in a grid pattern in the warped space, wherein each of the plurality of tiles is associated with a respective one or more scaling factors.

3. The method of claim 1, wherein one or more of the plurality of respective scaling factors include a horizontal scaling factor and a vertical scaling factor.

4. The method of claim 1, wherein generating the lens-compensated warped image comprises:
determining a pixel value of a particular pixel at a first location of the lens-compensated warped image based on the plurality of respective pixel values of pixels of the warped image in a neighborhood of a second location.

5. The method of claim 4, further comprising determining the second location based on the first location and a distortion function of the eyepiece.

6. The method of claim 4, wherein determining the pixel value of the particular pixel of the lens-compensated warped image includes determining corrected distances between the second location and pixel locations of the plurality of pixels in the neighborhood of the corresponding pixel of the warped image based on the respective scaling factors of the pixels in the neighborhood of the corresponding pixel of the warped image.

7. The method of claim 4, wherein determining the pixel value of the particular pixel of the lens-compensated warped image includes choosing one of the plurality of respective pixel values of pixels of the warped image in the neighborhood of the second location based on the respective scaling factors of the pixels of the warped image in the neighborhood of the second location.

8. The method of claim 4, wherein determining the pixel value of the particular pixel of the lens-compensated warped image includes averaging the plurality of respective pixel values of pixels of the warped image in the neighborhood of the second location based on the respective scaling factors of the pixels of the warped image in the neighborhood of the second location.

9. The method of claim 1, wherein generating a lens-compensated warped image is performed without generating an intermediate image in the display space.

10. A device comprising:
one or more processors;
a non-transitory memory;
a display;
an eyepiece; and
one or more programs stored in the non-transitory memory, which, when executed by the one or more processors, cause the device to:
receive a warped image with a plurality of pixels at respective locations uniformly spaced in a grid pattern in a warped space, wherein the plurality of pixels is respectively associated with a plurality of respective pixel values and a plurality of respective scaling factors indicating a plurality of respective resolutions at a plurality of respective locations in a display space; and
generate, based on the plurality of respectively pixels values of the warped image and the plurality of respective scaling factors, a lens-compensated warped image that is a version of the warped image distorted in an inverse relationship to distortion caused by an eyepiece.

11. The device of claim 10, wherein the warped image includes a plurality of tiles at respective locations uniformly spaced in a grid pattern in the warped space, wherein each of the plurality of tiles is associated with a respective one or more scaling factors.

12. The device of claim 10, wherein one or more of the plurality of respective scaling factors include a horizontal scaling factor and a vertical scaling factor.

13. The device of claim 10, wherein generating the lens-compensated warped image comprises:
determining a pixel value of a particular pixel at a first location of the lens-compensated warped image based on the plurality of respective pixel values of pixels of the warped image in a neighborhood of a second location.

14. The device of claim 13, wherein the one or more programs further cause the device to determine the second location based on the first location and a distortion function of the eyepiece.

15. The device of claim 13, wherein determining the pixel value of the particular pixel of the lens-compensated warped image includes determining corrected distances between the second location and pixel locations of the plurality of pixels in the neighborhood of the corresponding pixel of the warped image based on the respective scaling factors of the pixels in the neighborhood of the corresponding pixel of the warped image.

16. The device of claim 13, wherein determining the pixel value of the particular pixel of the lens-compensated warped image includes choosing one of the plurality of respective pixel values of pixels of the warped image in the neighborhood of the second location based on the respective scaling factors of the pixels of the warped image in the neighborhood of the second location.

17. The device of claim 13, wherein determining the pixel value of the particular pixel of the lens-compensated warped image includes averaging the plurality of respective pixel values of pixels of the warped image in the neighborhood of the second location based on the respective scaling factors of the pixels of the warped image in the neighborhood of the second location.

18. The device of claim 10, wherein generating a lens-compensated warped image is performed without generating an intermediate image in the display space.

19. A non-transitory memory storing one or more programs, which, when executed by one or more processors of a device including a display and an eyepiece, cause the device to:
receive an image with a plurality of pixels at respective locations uniformly spaced in a grid pattern in a n image space, wherein the plurality of pixels is respectively associated with a plurality of respective pixel values;
generating a lens-compensated image that is a version of the image distorted in an inverse relationship to distortion caused by the eyepiece;
receive a plurality of respective scaling factors indicating a plurality of respective resolutions at a plurality of respective locations in a display space; and
generating, based on the plurality of respective pixels values of the lens-compensated image and the plurality of respective scaling factors, a lens-compensated warped image.

20. The non-transitory memory of claim 19, wherein one or more of the plurality of respective scaling factors include a horizontal scaling factor and a vertical scaling factor.

21. The non-transitory memory of claim 19, wherein generating a lens-compensated warped image is performed without generating an intermediate image in the display space.

* * * * *

UNITED STATES PATENT AND TRADEMARK OFFICE
CERTIFICATE OF CORRECTION

PATENT NO. : 12,131,437 B2
APPLICATION NO. : 18/510916
DATED : October 29, 2024
INVENTOR(S) : Tobias Eble et al.

Page 1 of 1

It is certified that error appears in the above-identified patent and that said Letters Patent is hereby corrected as shown below:

In the Claims

Column 44, Line 60, reading "respectively pixels values" should be changed to --respective pixel values--.

Column 45, Line 60, reading "respectively pixels values" should read --respective pixel values--.

Column 46, Lines 50-51, reading "a n image space" should be changed to --an image space--.

Column 46, Line 55, reading "generating" should be changed to --generate--.

Column 46, Line 61, reading "generating" should be changed to --generate--.

Column 46, Lines 61-62, reading "respective pixels values" should be changed to --respective pixel values--.

Signed and Sealed this
Eleventh Day of February, 2025

Coke Morgan Stewart
*Acting Director of the United States Patent and Trademark Office*